(12) United States Patent
Loach

(10) Patent No.: US 9,731,157 B2
(45) Date of Patent: Aug. 15, 2017

(54) HAND-HELD EXERCISE APPARATUS AND RESISTANCE MECHANISM FOR EXERCISE APPARATUS

(76) Inventor: Andrew Loach, Bebington Wirral (GB)

( * ) Notice: Subject to any disclaimer, the term of this patent is extended or adjusted under 35 U.S.C. 154(b) by 75 days.

(21) Appl. No.: 14/117,940

(22) PCT Filed: May 18, 2012

(86) PCT No.: PCT/EP2012/059285
§ 371 (c)(1),
(2), (4) Date: Nov. 15, 2013

(87) PCT Pub. No.: WO2012/156516
PCT Pub. Date: Nov. 22, 2012

(65) Prior Publication Data
US 2014/0113779 A1 Apr. 24, 2014

(30) Foreign Application Priority Data
May 19, 2011 (GB) .................................. 1108398.7

(51) Int. Cl.
*A63B 21/045* (2006.01)
*A63B 21/02* (2006.01)
(Continued)

(52) U.S. Cl.
CPC .......... *A63B 21/02* (2013.01); *A63B 21/0004* (2013.01); *A63B 21/00043* (2013.01);
(Continued)

(58) Field of Classification Search
CPC ............ A63B 21/153; A63B 21/00069; A63B 21/4043; A63B 21/025; A63B 21/015;
(Continued)

(56) References Cited

U.S. PATENT DOCUMENTS 3,544,105 A * 12/1970 Latta .................... A63B 21/018
482/120
3,596,907 A * 8/1971 Brighton .......... A63B 21/00069
482/120
(Continued)

FOREIGN PATENT DOCUMENTS

GB 2443761 B 10/2011

OTHER PUBLICATIONS

International Preliminary Report on Patentability in corresponding PCT Application No. PCT/EP2012/059285, mailed Nov. 19, 2013.
International Search Report and Written Opinion in corresponding PCT Application No. PCT/EP2012/059285, mailed Jan. 28, 2013.

*Primary Examiner* — Andrew S Lo

(57) ABSTRACT

A hand-held exercise device comprises a frame, a handle attached to the frame, a spool element pivotally mounted to the frame, a pull-cord movable between a wound configuration in which the pull-cord is wound around the spool element and an unwound configuration in which the pull-cord is unwound from the spool element, a resistance element pivotally mounted to the frame, a transmission that couples the pull-cord to the resistance element such that pulling the pull-cord from the device causes the resistance element to rotate, and a damping means that acts to slow the rotation of the resistance element. The device provides a compact and lightweight form of exercise equipment that is easy to carry and easy to store. The device can be used with various fixtures, and also with a second handle fixed to the pull-cord, to allow the user to perform a wide range of exercises. Preferably the exercise device transmits exercise data to an external device that provides feedback and guidance to the user.
A resistance mechanism for exercise apparatus allows a pull-cord to be coupled to a resistance element such that pulling the pull-cord from the mechanism causes the resistance element to rotate. A drive element is driven by a
(Continued)

frictional force between the drive element and the pull-cord. The resistance element is coupled to the drive element by a transmission.

2 Claims, 13 Drawing Sheets

(51) Int. Cl.
| | |
|---|---|
| *A63B 21/00* | (2006.01) |
| *A63B 21/005* | (2006.01) |
| *A63B 21/008* | (2006.01) |
| *A63B 21/018* | (2006.01) |
| *A63B 21/16* | (2006.01) |
| *A63B 23/035* | (2006.01) |
| *H02K 49/04* | (2006.01) |
| *A63B 21/22* | (2006.01) |
| *A63B 23/02* | (2006.01) |
| *A63B 24/00* | (2006.01) |
| *A63B 71/06* | (2006.01) |

(52) U.S. Cl.
CPC ...... *A63B 21/0051* (2013.01); *A63B 21/0053* (2013.01); *A63B 21/0056* (2013.01); *A63B 21/00069* (2013.01); *A63B 21/00076* (2013.01); *A63B 21/0088* (2013.01); *A63B 21/018* (2013.01); *A63B 21/153* (2013.01); *A63B 21/157* (2013.01); *A63B 21/1663* (2013.01); *A63B 21/4035* (2015.10); *A63B 21/4043* (2015.10); *A63B 23/03508* (2013.01); *H02K 49/04* (2013.01); *A63B 21/025* (2013.01); *A63B 21/225* (2013.01); *A63B 23/0216* (2013.01); *A63B 23/03525* (2013.01); *A63B 23/03533* (2013.01); *A63B 23/03541* (2013.01); *A63B 23/03575* (2013.01); *A63B 24/0062* (2013.01); *A63B 24/0087* (2013.01); *A63B 71/0622* (2013.01); *A63B 2208/0204* (2013.01); *A63B 2208/0238* (2013.01); *A63B 2220/24* (2013.01); *A63B 2220/30* (2013.01); *A63B 2220/40* (2013.01); *A63B 2220/50* (2013.01); *A63B 2220/54* (2013.01); *A63B 2225/20* (2013.01); *A63B 2225/50* (2013.01); *H02K 2213/09* (2013.01)

(58) Field of Classification Search
CPC . A63B 21/023; A63B 21/0552; A63B 21/157; A63B 21/018; A63B 21/4047; A63B 2022/0079; A63B 21/045; A63B 21/05; A63B 21/055
USPC .......... 482/114–115, 118, 120–124, 126–127
See application file for complete search history.

(56) References Cited

U.S. PATENT DOCUMENTS

| | | | | |
|---|---|---|---|---|
| 3,885,789 | A * | 5/1975 | Deluty | A63B 21/018 242/147 R |
| 4,010,948 | A * | 3/1977 | Deluty | A63B 21/153 188/65.3 |
| 4,114,875 | A * | 9/1978 | Deluty | A63B 21/018 188/65.1 |
| 4,557,480 | A * | 12/1985 | Dudley | A63B 21/018 482/120 |
| 4,846,460 | A * | 7/1989 | Duke | A63B 21/153 482/73 |
| 4,871,165 | A | 10/1989 | Marshall et al. | |
| 4,884,800 | A * | 12/1989 | Duke | A63B 21/154 482/111 |
| 4,944,511 | A * | 7/1990 | Francis | A63B 21/02 482/116 |
| 5,077,922 | A * | 1/1992 | Miller | G09F 11/26 40/415 |
| 5,226,867 | A * | 7/1993 | Beal | A63B 21/153 482/120 |
| 5,409,435 | A * | 4/1995 | Daniels | A63B 21/00845 482/5 |
| 5,417,416 | A * | 5/1995 | Marmin | B65H 29/68 271/182 |
| 5,480,375 | A * | 1/1996 | La Fosse | A61H 1/0229 482/144 |
| 5,581,180 | A * | 12/1996 | Ito | B61B 12/06 324/207.11 |
| 5,820,519 | A * | 10/1998 | Slenker | A63B 21/015 482/114 |
| 6,309,328 | B1 | 10/2001 | Dudley | |
| 6,368,259 | B1 * | 4/2002 | Liao | A63B 21/0455 482/121 |
| 6,413,196 | B1 * | 7/2002 | Crowson | A63B 21/153 273/317 |
| 7,137,936 | B1 * | 11/2006 | Shaw | A63B 21/025 482/101 |
| 7,621,856 | B1 * | 11/2009 | Keith | A01K 27/004 119/796 |
| 7,637,853 | B2 * | 12/2009 | Crowson | A63B 21/00 482/127 |
| 2002/0025891 | A1 * | 2/2002 | Colosky, Jr. | A63B 21/025 482/127 |
| 2002/0086779 | A1 * | 7/2002 | Wilkinson | A63B 23/1209 482/118 |
| 2006/0148622 | A1 * | 7/2006 | Chen | A63B 21/153 482/72 |
| 2009/0036276 | A1 * | 2/2009 | Loach | A63B 21/15 482/72 |
| 2009/0093350 | A1 | 4/2009 | Jahns | |
| 2010/0298104 | A1 * | 11/2010 | Turner | A63B 21/00069 482/93 |
| 2012/0205479 | A1 * | 8/2012 | Wang | A01K 27/004 242/396.4 |

* cited by examiner

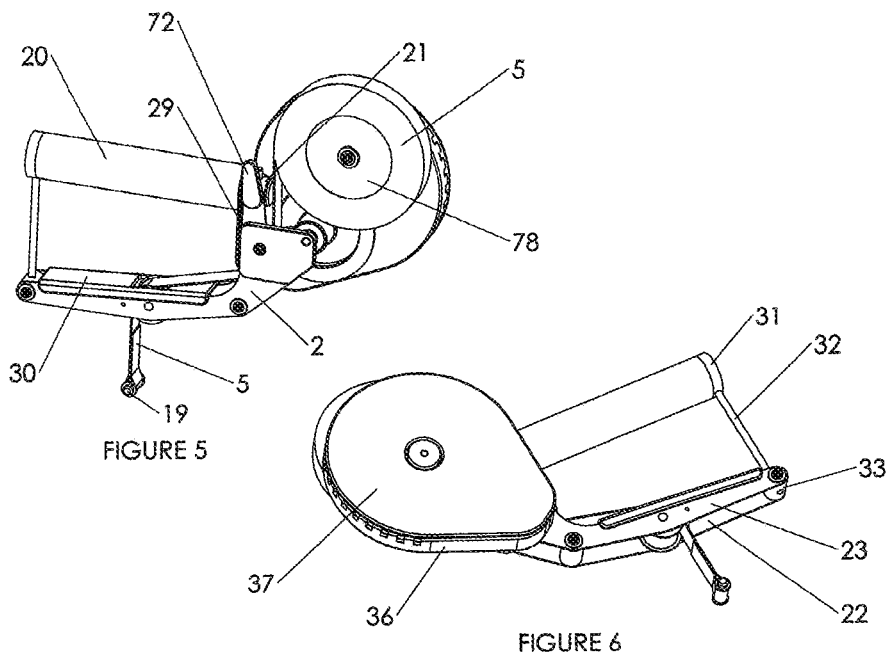
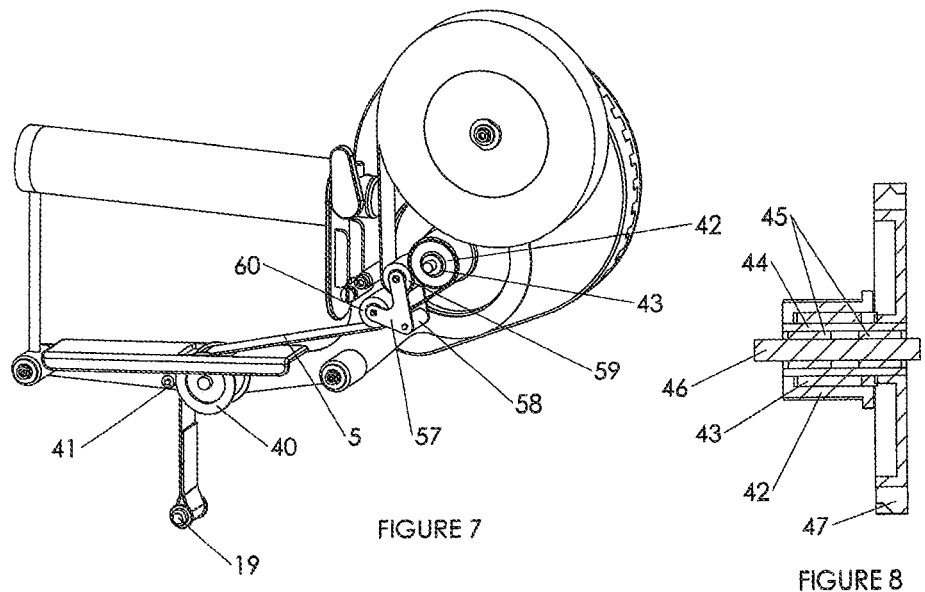

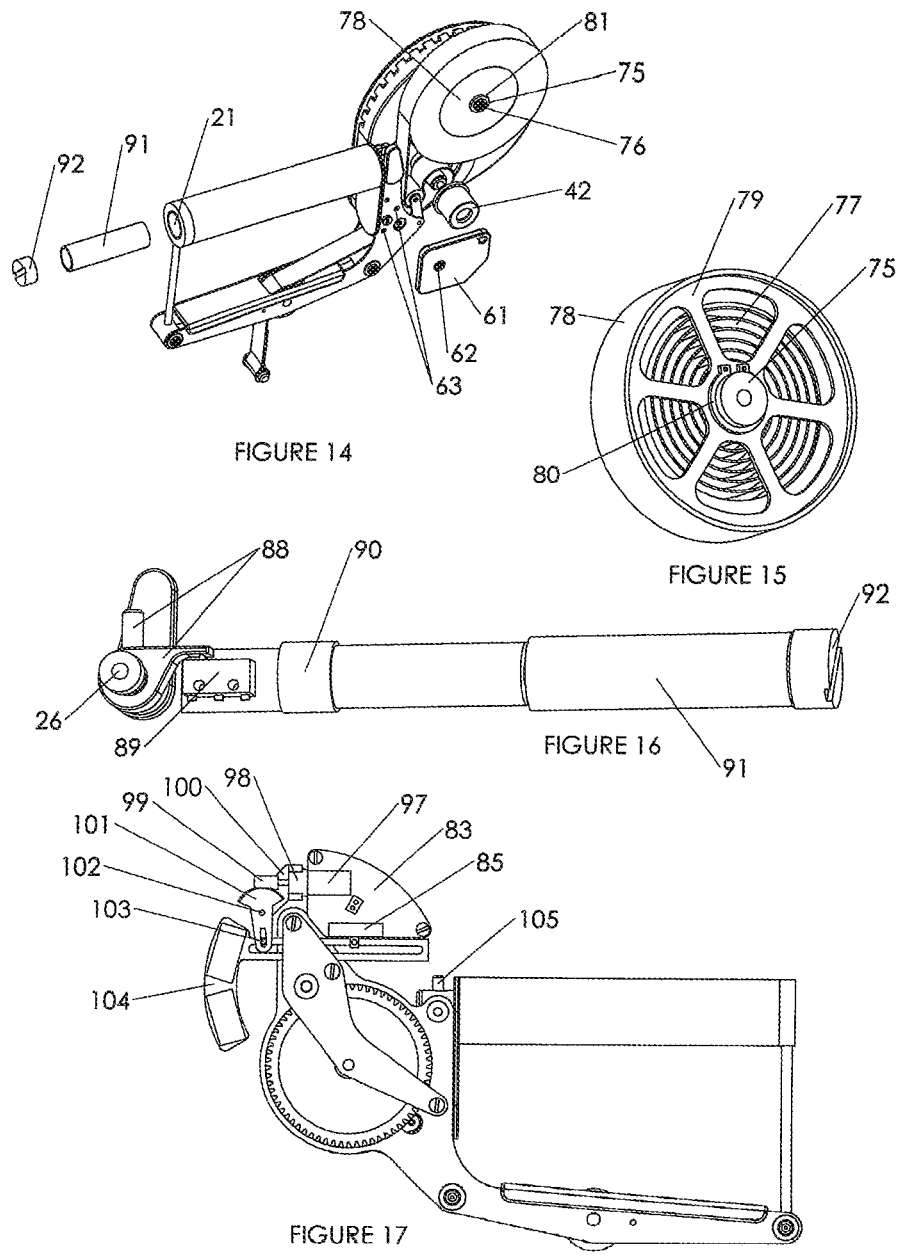

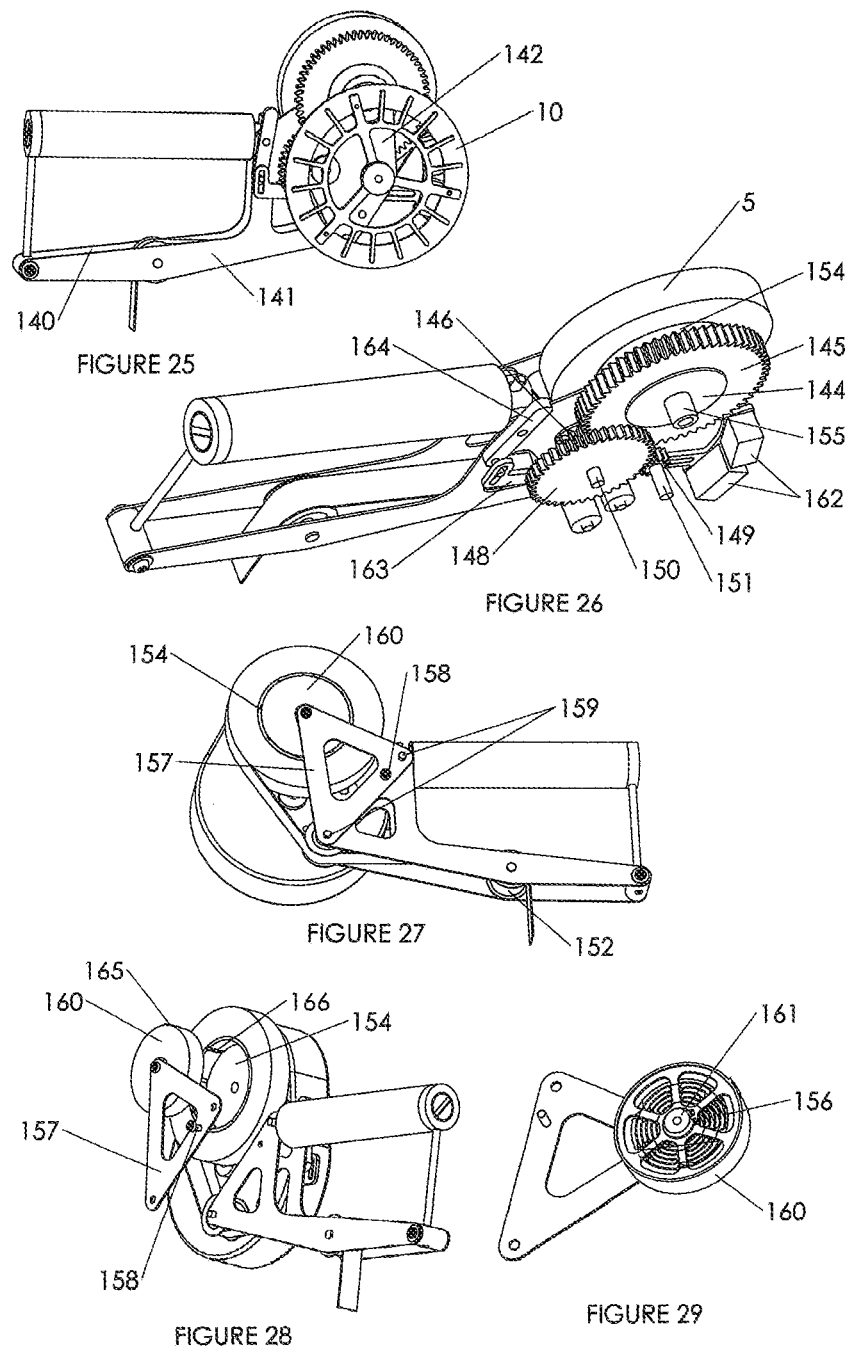

HAND-HELD EXERCISE APPARATUS AND RESISTANCE MECHANISM FOR EXERCISE APPARATUS

CROSS-REFERENCE TO RELATED PATENT APPLICATIONS

This application is a U.S. National Phase Application under 35 U.S.C. §371 of International Patent Application No. PCT/EP2012/059285, filed May 18, 2012, and claims the benefit of Great Britain Application No. 1108398.7, filed May 19, 2011, all of which are incorporated by reference herein. The International Application was published on Nov. 22, 2012 as International Publication No. WO 2012/156516 A3 under PCT Article 21(2).

This invention addresses the problem of providing exercise apparatus that allows the user to perform a wide variety of strength training and aerobic exercise in a form that is easy to use, easy to store and easy to transport. Additionally this invention seeks to provide the user with a high level of feedback and interactive guidance during exercise.

A typical gymnasium workout requires the use of several large floor standing machines. For example, the user may make use of several weight-lifting machines as well as a treadmill, cycle or rowing machine. Multi-station machines, provided for home use, attempt to combine the functions of some of these machines. Some rowing machines and cycles are adapted to be multi-purpose devices. However, all of these machines occupy a significant amount of space even when stored and are too heavy and unwieldy to be easily carried by the user or easily and unobtrusively stored.

Some compact versatile exercise equipment already exists. Isometric trainers based on spring resistance have been popular choices for enabling a wide variety of strength building exercise. Similarly elastic resistance bands are commonly used and can be very effective. However, these options are limited to providing a resistance that is dependent on displacement. They do not allow the user to easily achieve a specific resistance throughout an exercise movement. They do not allow for smooth sustained exercise hence do not provide a comfortable aerobic exercise experience.

Dumbbells do not necessarily occupy a great amount of space. However, they are heavy and a number of dumbbells of different weights are required in order to perform a wide range of exercises. Again, dumbbells do not facilitate comfortable aerobic exercise.

Suspension systems, that make use of the body weight of the user to provide resistance, are also popular. They can be easily carried and stored but do require a suitable suspension point that must be strong enough to ensure the safety of the user. It is also difficult to implement a system of feedback of exercise data to the user.

A number of pull-cord resistance systems are suggested in prior art. Generally, these systems resist pulling of a pull-cord from the machine. The pull-cord is usually wound around a spool and is automatically retracted following the pulling stroke. Typically a handle is fixed to an end of the pull-cord while the spool and resistance means are contained within a base assembly that rests on the floor or is fixed to a fixture. A number of identifiable deficiencies have perhaps contributed to the lack of popularity of these machines.

Many of the proposed apparatus rely on frictional contact to resist movement of the pull-cord from the apparatus. Examples include U.S. Pat. No. 3,885,789 Deluty and U.S. Pat. No. 4,871,165 Marshall. Most of these systems provide some facility for the resistance to be adjusted. However, the resistance level typically remains fixed throughout the pulling stroke. There is not a smooth progression of resistance but rather a sudden application of the resistance at the start of the stroke with the resistance held at the same level through the stroke. Adjustment of resistance is typically not possible during the stroke and requires halting the exercise.

Frictional resistance will also result in wear of the contacting components. Components may need to be regularly replaced. Heat will be generated at the contact and provision must be made for this heat to be dissipated to the surrounding air to avoid excessive temperatures within the apparatus.

Additionally, frictional resistance can produce a stick-slip motion that would result in a very uncomfortable exercise experience.

There are some proposed devices that make use of inertial resistance, for example US2009/0093350 Jahns. Typically a flywheel is driven by a pull-cord. Once the pull-cord is fully unwound from the spool, the spool continues to rotate, driven by the flywheel, and the pull-cord is wound back on to the spool. This has the disadvantage of requiring fixed-length pulling strokes dictated by the length of the pull-cord that is wound around the spool. Additionally, the resistance offered is only dependent upon the acceleration of the pull-cord. Hence to maintain a near constant resistance through the stroke, the user would have to continuously and constantly accelerate the pull-cord through the stroke. Adjustment of the resistance level is difficult and would typically require either an adjustment of the inertia of the flywheel or a change of the gearing ratio between the spool and flywheel.

GB2443761 Loach, proposes a compact resistance unit that comprises a flywheel that is driven by the pull-cord and is braked by a magnetic damping means. This provides the advantage of a progressive resistance that is dependent upon the speed of withdrawal of the pull-cord. This speed-dependent resistance allows the user to control the tension in the pull-cord throughout the pulling stroke. The resistance mechanism allows for compact and lightweight apparatus to be produced.

The present invention proposes pull-cord based apparatus and associated resistance means that provide alternative and additional features that extend the versatility of the apparatus, provide an improved resistance unit and improve the exercise experience for the user.

The present invention relates to versatile hand-held exercise apparatus as well as a compact resistance means for exercise apparatus.

According to a first aspect of the present invention a hand-held exercise device comprises:
a frame;
a first handle attached to said frame;
a spool element pivotally mounted within said frame;
a pull-cord having a first end and a second end and a flexible member between the first and second end, the first end connected to said spool element, said pull-cord movable between a wound configuration in which the pull cord is wound around said spool element and an unwound configuration in which said pull cord is unwound from said spool element;
a resistance element pivotally mounted to said frame that rotates in a constant direction;
a transmission means that couples the pull-cord to the resistance element such that pulling the pull-cord from the device causes the resistance element to rotate;
a recoil means that acts to move the pull-cord towards the wound configuration when there is no pulling force applied to the second end of the pull-cord; and a damping means that acts to slow the rotation of the resistance element.

Preferably the resistance element is a flywheel.

Said pull-cord can be any flexible element that can be wound around a curved surface provided by the spool element. The pull-cord can be a rope, cord, strap or chain. Preferably the pull-cord is a length of fabric webbing.

Preferably said handle is held by one hand only.

Preferably said pull-cord is arranged such that the line of action of the pulling force applied by the user to the pull-cord passes through said first handle Preferably the device has a mass of less than 2 kg. This is a practical limit that ensures the user can perform exercises that involve moving the device in directions away from the vertical. It is also desirable to minimise the mass and size of the device to make the device easier to carry and easier to store. A practical size requirement is that the device fits within a space envelope measuring 35 cm by 20 cm by 6 cm. This allows the device to fit in to typical briefcases, hand luggage and laptop bags.

Preferably the pull-cord passes over a guide element in order to guide the pull-cord during pulling and recoil. The guide element is pivotally mounted to the frame. The guide element ensures that the line of action of the pulling force passes through the handle. Hence the user can apply a direct force and does not have to resist a torque at the handle.

Having a handle fixed directly to the resistance unit greatly improves the range of exercises that can be performed. This is in contrast to existing apparatus that make use of a handle fixed to the pull-cord with the resistance unit being held on the floor or fixed to a wall. The first handle being fixed to the resistance unit allows the user to grip the first handle in one hand while the second end of the pull-cord is held in place either by a fixture or a second handle. Another significant advantage of this arrangement is that it allows the user to operate an adjustment mechanism associated with the resistance element without releasing grip of the handle. This is more convenient than the alternative of interrupting exercise to release the handle and reach out to the adjustment mechanism.

Preferably the handle comprises an outer part pivotally mounted to the frame such that the user can maintain a grip on the outer part while the frame rotates relative to the hand of the user. The pivotally mounted outer part is advantageous for performing exercises such as arm curls because such exercise requires the frame to rotate relative to the hand of the user. The pull-cord tension acts to rotate the exercise device about the handle axis until the line of action of the tension passes close to the handle axis. Preferably there is some limited frictional contact at a bearing surface that supports the outer part of the handle. This contact prevents the device from moving unstably when the tension in the pull-cord is low, particularly during recoil. It is advantageous that the axis around which the outer part pivots is close to the centre of mass of the exercise device. This reduces the moment due to the weight of the exercise device that acts about the handle axis. Hence lower contact friction is required to prevent rotation of the resistance unit about the handle axis when the pull-cord is recoiling. This is particularly important when performing pull-down exercises in which the tension in the pull-cord acts to lift the exercise device upwards while gravity is acting to pull the exercise device down. The contact friction prevents the exercise device from flipping about the handle axis between the pull-down stroke and recoil. A typical hand-held device as disclosed may weigh approximately 1 kg. It is suggested that the distance between the rotation axis of the handle and the centre of mass of the device is below 3 cm. This is a practical limit that allows a frictional contact to be applied to the handle that will prevent unwanted rotation of the handle during recoil while allowing the device to sufficiently align to the pull-cord during exercise.

The damping means applies a torque to the resistance element that acts to slow the resistance element. This results in energy dissipation from the resistance element while it is rotating. The resistance element is a pivotally mounted element that is driven by the pulling of the pull-cord and that it slowed by action of the damping means.

Preferably the resistance element comprises a rotationally balanced element that is electrically conductive and the damping means comprises one or more permanent magnets arranged such that magnetic flux passes through the electrically conductive element. This results in eddy currents forming within the electrically conductive element and the development of a braking force acting on the resistance element. Alternatively the magnetic flux could be produced by an electromagnet. Preferably the electrically conductive element is in the form of a flat sided ring.

Alternatively the resistance element comprises a fan element that is resisted by air pressure due to the movement of air caused by rotation of the fan element. Preferably the fan element comprises a hub or base and radially extending features that move the surrounding air as the fan element rotates.

Alternatively the resistance element comprises a turbine element surrounded by a viscous fluid. The viscous fluid could be water or oil.

Preferably an adjustment means is provided such that the user can adjust the level of resistance offered by the apparatus, by use of the hand that grips the first handle, while maintaining a grip on the first handle. Preferably this adjustment means is operated by a control means operated by the thumb of the user. Alternatively the control means could be operated by one or more fingers. Preferably the adjustment means comprises a mechanism that moves part of a magnetic damping means such that the magnetic flux passing through the electrically conductive element of the resistance element changes. Alternatively the adjustment means comprises one or more variable apertures within an enclosure that surrounds a fan element. The size of the apertures is controlled by the user.

These mechanisms can either be operated by the user by direct mechanical means or alternatively the mechanisms can be electrically actuated in which case the user operates the mechanism by using one or more buttons or switch means located close to the first handle.

Preferably said transmission means provides a high ratio of peripheral speed of the resistance element to linear speed of the pull-cord. Such a high ratio presents a number of advantages. Firstly, for a given tension in the pull-cord and a given linear speed of the pull-cord, the resistive force that needs to be applied to the resistance element decreases as said ratio increases. This allows a smaller resistance element and a smaller resistance mechanism to be used. Secondly, in both the case of magnetic damping and air damping, the damping force increases as the speed of the resistance element increases. A high ratio therefore results in a reduction of the size and strength requirements for the components that make up the resistance mechanism. Thirdly, for smooth continuous exercise, such as aerobic activity, it is advantageous to store energy in the resistance element between pulling strokes. The resistance element acts as a flywheel. A faster spinning flywheel can store the same energy as a heavier flywheel that spins slower. Hence the mass and size of the resistance element can be reduced, while maintaining the level of energy storage, if said ratio is increased. Preferably the resistance element has a mass of less than 300 grams and a maximum diameter less than 150 mm.

A minimum ratio of one resistance element rotation per 25 mm of linear pull-cord movement is suggested as a practical measure to ensure that sufficient resistive torque can be provided to the resistance element by the damping means. It is preferable that this ratio is close to one flywheel rotation per 10 mm of linear pull-cord movement. This ratio of one rotation per 10 mm allows a device that weighs less than 1.5 kg to provide more than 200N of pull-cord tension at a linear pull-cord speed of 0.5 m per second. Higher rotation speed relative to pull-cord movement results in higher braking force as well as higher mechanical advantage. Hence in this case, for a magnetically damped system, the magnetic flux provided can be reduced by a factor of approximately 25, relative to the case of the suggested minimum ratio, to achieve the same pull-cord tension at the same pull-cord speed while the flywheel size and material and thickness of the electrically conductive element is the same in both cases.

The minimum rate can be considered useful for apparatus providing a relatively low level of resistance while minimising the level of gearing required. A maximum ratio of one rotation of the resistance element to 3 mm of linear pull-cord speed is suggested as a practical measure to avoid resistance element speeds that can cause excessive noise and out-of-balance forces.

These suggested ratios can be implemented by a number of different means including those detailed in further aspects of the invention and the detailed description.

A further advantage of implementing a high ratio of resistance element speed to linear pull-cord speed is an increase in inertial resistance. A small and lightweight flywheel, of relatively low moment of inertia, coupled to the pull-cord by high-ratio gearing provides equivalent resistance to a flywheel of far higher moment of inertia that is coupled directly to the pull-cord spool. The inertial resistance is experienced during acceleration of the flywheel. It is therefore most useful during strength training exercises performed at a low rate of repetition. In this case the flywheel accelerates from near zero speed at the start of each stroke. The combination of inertial resistance with speed-dependent resistance provided by the damping mechanism can provide very high pull-cord tensions for strength training exercise. The inertial component dominates at the start of the stroke while the speed-dependent component is dominant once the flywheel reaches a high speed. The high ratio gearing results in high energy storage as well as high inertial resistance. Hence during aerobic exercises, in which the stroke rate is relatively high, there will not be a great speed variation between strokes. Hence in this case the speed-dependent resistance will dominate.

Preferably said pull-cord is accessible to the user such that it can be replaced by the user as required. Preferably this is made possible by a removable spool element. Preferably said recoil means is provided by a coil spring that acts on said spool element and is biased to move the spool element towards the wound configuration. Due to the limited lifetime of such springs it is preferable that the spring is provided as part of a unit that can be replaced by the user. It is preferable that the spring is contained within the spool element such that spring, spool element and pull-cord can be replaced as a unit. Preferably an assembly comprising a spool element, a coil spring and an arbor element, whereby the coil spring is attached at one end to the spool element and at another end to the arbor, and whereby the spool element is pivotally mounted to the arbor, is made available as a replacement unit. This replacement unit may be made available with a pull-cord fitted to the spool element.

Said apparatus provides a compact, lightweight system that enables a wide variety of exercise where the first handle is held in one hand of the user and the pull-cord is repeatedly pulled from the apparatus and then allowed to recoil.

According to a second aspect of the present invention, exercise apparatus comprises:
 a hand-held exercise device as described previously; and
 a second handle means that is fixed to the pull-cord.

Preferably the second handle is detachable from the pull-cord. This allows the second handle to be easily stowed when not in use.

Preferably the second handle comprises an outer part and supporting means such that the outer part can rotate about the supporting means. This is advantageous for performing exercises such as arm curls because such exercise requires the supporting means to rotate relative to the hand of the user. Preferably said supporting means comprises one or more flexible members that connect the supporting means to the pull-cord. This is advantageous because it allows the handle assembly to collapse to a very compact form for storage.

Said apparatus allows a wide variety of strength training exercises to be performed, notably including two-handed exercise. These exercises include chest expansion, arm curls, side lateral raises, above-head extension, and archery simulation.

Preferably a pulley means is provided. Preferably the pulley means comprises a single pulley wheel supported within a frame. Additional guide wheels may be used to guide the pull-cord and to prevent the pull-cord moving out of alignment with the pulley wheel. The pulley means can be attached to a fixture means. Preferably said fixture means is an element on which the user stands. Alternatively said fixture means comprises attachment means that is fixed to a wall, floor, door or door-frame.

The pull-cord passes around said pulley wheel. During exercise the user pulls both the first handle and the second handle away from the pulley wheel. This enables the user to perform two-handed exercises such as arm curls, power cleans, side raises, front raises and squats. The user experiences the same tension acting on each handle. This balanced tension is a clear advantage over the alternative of using a separate resistance device for each handle, in which case each resistance device would have to be carefully adjusted to provide the same resistance as the other.

The pulley arrangement results in the resistance element rotating at twice the speed that it would if the same exercise were performed at the same rate using a single handle. This is advantageous in the case of a speed-dependent damping mechanism in that it allows an increased resistance to be provided by the same resistance mechanism for a given pull speed. This is due to an increase in the level of damping caused by an increase in the speed of the resistance element.

Preferably the pulley wheel is supported such that the axis of rotation of the pulley wheel remains perpendicular to the line of action of the net force provided by the pull-cord. This can be achieved by providing a pivot that lies in a plane that passes through the centre of the pulley wheel and has a normal vector parallel to the axis of the pulley wheel. The pivot must be on the opposite side of the pulley wheel to the ends of the pull-cord. It is possible that this pivot can be provided by using a flexible member to fix the pulley unit frame to the fixture.

Optionally a number of guide wheels are mounted within said frame such that the pull-cord makes contact with the circumferential surface of each guide wheel. This is advantageous for preventing the pull-cord from slipping off or twisting on the pulley-wheel.

Alternatively the pulley unit comprises a number of pulleys. The pull-cord passes over each pulley. A pulley unit comprising two pulley wheels separated by a support structure has some advantages over a single pulley version. The two pulley version allows the user to perform exercises where the two sides of the pull-cord are pulled along substantially parallel trajectories during exercise. This allows the two handles to be pulled vertically upwards, rather than at an angle to the vertical, during exercises such as arm curls. Alternatively, the separation provided could allow the handles to be pulled along parallel trajectories either side of the legs of the user during a rowing type exercise.

Preferably there is sufficient length of pull-cord stored on the spool to allow for sufficient extension of the pull-cord from the frame for long range two-handed exercises that utilise a pulley unit, to be performed. An upright rowing exercise in which the user reaches from feet to shoulders requires in excess of 250 cm extension of the pull-cord. This provides for a length of pull-cord extending between the exercise device and the pulley unit and a further length of pull-cord extending from the pulley unit to the second handle. The present invention provides for this extension.

According to a third aspect of the present invention, hand-held exercise apparatus comprises:
  a hand-held exercise device as described previously; and
  a fixture means connected to a wall or a door.

Preferably said fixture means is held in place between a door and door-frame. Such fixture means can be trapped either above the door or at the side of the door to allow a variety of fixing heights. The fixture includes means to fix part of the pull-cord in position. Alternatively the fixture means may be used to fix a pulley means so that the pull-cord can pass around said pulley means, in which case a second handle may be attached to the pull-cord, and the user can perform a number of two handed exercises such as pull-downs and standing presses. It is additionally preferable that the fixture means also allows the first handle or frame of the apparatus to be held in a fixed position. In this case a second handle or leg fixing means can be attached to the pull-cord to allow the user to perform exercises such as leg swings or arm swings. Alternatively said fixture means could be attached to a wall by use of wall fixings such as screws or bolts.

According to a fourth aspect of the present invention, resistance means for exercise apparatus comprises:
  a frame;
  a pull-cord;
  a drive element pivotally mounted to the frame;
  a grip element pivotally mounted to a moveable support that is mounted within the frame;
  a resistance element pivotally mounted to the frame; and
  a transmission means that couples the drive element to the resistance element;
  wherein the grip element is in contact with the pull-cord so that the pull-cord is pushed against an outer surface of the drive element;
  wherein the pull-cord makes contact with a surface of the drive element and a frictional force exists between the pull-cord and drive element so that the resistance element is caused to rotate as the pull-cord is pulled from the device.

Such a resistance means is applicable to hand-held exercise apparatus as well as free-standing apparatus.

Preferably the pull-cord makes contact with a substantial portion of the circumferential surface of the drive element. This results in a reduction of the shear stress occurring at the contacting surfaces. The grip element pushes the pull-cord against the drive element. This forced contact ensures that the pull-cord does not substantially slip around the drive element.

Preferably the drive element is mounted to the frame of the apparatus such that it can be accessed by the user in order to either replace the drive element or replace an outer covering of the drive element. This is advantageous because wear of the outer surface or covering of the drive element may occur.

Preferably the outer covering of the drive element is a durable high friction covering such as a durable rubber compound. Alternatively the outer surface of the drive element is a rough surface such as a knurled surface or an abrasive coating.

Preferably the drive element is coupled to the resistance element by a one-way transmission and a gear stage. Such a one-way transmission may be provided by a one way bearing of a spragg or roller type. It is preferable that helical gears are used in the gear stage in order that gear noise is reduced.

Alternatively spur gears, a planetary gear arrangement, belt driven pulleys, chain linked sprockets or friction-contacting rollers may be used to provide the gearing. It is also possible that the gear stage be omitted if the damping mechanism adopted is sufficient to provide adequate resistance without additional mechanical advantage.

Preferably the damping mechanism is a magnetic mechanism in which eddy currents are induced in the resistance element. Alternatively the damping could be provided by air resistance acting on radially extending features of the resistance element. Alternatively a frictional damping method may be employed, for example a belt of friction material in contact with a surface of the resistance element or brake pads in contact with one or more surfaces of the resistance element.

This aspect of the invention provides resistance means for any exercise apparatus that utilises a pull-cord to drive a rotating element. Typical apparatus that use such means include rowing machines and some strength training equipment. Specifically, this aspect of the invention provides advantages of small size, light weight and low cost of manufacture, relative to devices of similar function that are known in the art. It is therefore of particular importance to portable exercise apparatus or to exercise apparatus that is intended to be easy to store in small spaces. This aspect of the invention facilitates a hand-held exercise device that weighs less than 1 kg, fits within a space envelope of 30 cm by 18 cm by 5 cm, and can provide a pull-cord tension in excess of 200N at a linear pull-cord speed of 0.5 meters per second.

The most common methods for providing resistance in pull-cord driven exercise equipment are based on driving relatively large and heavy flywheels or turbines. In some instances a pull-cord of fabric webbing or cord is wound around a spool such that it drives the flywheel or turbine directly or via a system of gears. In other instances a chain is used rather than a cord such that pulling on the chain turns a sprocket that drives the flywheel or turbine directly or via a system of gears.

In order to produce a compact and lightweight arrangement, it is necessary to avoid the use of a chain and sprocket system due to both the inherent high weight and the difficulty of storing a practical length of chain in a compact form.

Narrow webbing is a common choice for a pull-cord due to its strength, smooth running, and ease of storage on a spool. In order to store a practical length of material on a spool, the spool must be of at least a minimum size. For example, 2 m of 1 mm thick webbing on a 50 mm diameter hub results in the fully coiled spool being approximately 71 mm in diameter. If the spool is then used to drive a flywheel, the flywheel will spin over 40% faster at the end of the pulling stroke than at the beginning for the same linear pulling speed. As the size of spool decreases, there is an increase in the ratio of flywheel speed at the end of the stroke to speed at the start of the stroke. Preferable damping methods, such as eddy current braking and air resistance, are dependent on flywheel speed such that if this ratio is too large, the user will notice an uncomfortable variation in resistance through the stroke.

The range of radii at which the pull-cord leaves the coil dictates the gearing requirement between the spool and flywheel or turbine in order to arrive at the necessary ratio of flywheel or turbine speed to linear pull-cord speed. For large machines that include large and heavy flywheels it may be sufficient to drive the flywheel directly from the spool without an intermediate gear stage. For compact and lightweight equipment it is necessary to use a smaller flywheel of lower mass. In this case it is necessary that the ratio of rotational speed of the flywheel to the linear pull-cord speed is higher in order that sufficient resistance is developed by the damping means, that sufficient energy is stored for the flywheel speed not to vary too much between strokes, and to reduce the load on the braking system. Higher flywheel speed is particularly important for eddy current damped devices in that higher speed reduces the magnetic flux requirement and allows fewer or smaller magnets to be used. The additional mechanical advantage also amplifies the effect of the braking system.

This aspect of the invention provides a system in which the flywheel is not driven directly or via gears from the spool but rather by a drive element that grips the pull-cord such that the peripheral speed of the drive element at the point of contact is equal to the linear speed of the pull-cord. Given that the radius of such a drive element can be significantly less than even the smallest radius at which the pull-cord can leave the coil, this system drives the drive element at a significantly greater rotational speed than the spool would be driven.

A practical average value for the coil radius on the spool may be 30 mm. Hence if a 20 mm diameter drive element is used, there is a 3 to 1 speed advantage over the spool driven system. This can be sufficient to reduce the number of gear stages that follow in order to attain a flywheel speed that is high enough.

Another advantage provided by this system is that there is no variation in the ratio of flywheel speed to linear pull-cord speed as the pull-cord is unwound. This results in the response of the resistance unit being predictable regardless of the amount of pull-cord that is unwound from the spool. This is particularly beneficial for strength training exercise in which the user attempts to keep the pull-cord tension constant over a range of motion.

Torque applied to the spool or drive element can be calculated from measurements of the rate of rotation of the flywheel but it is not possible to calculate the pull-cord tension from this unless the radius at which the tension is acting is known. Hence an additional benefit, of being able to calculate and display cable tension by use of a single rotation sensor, can result from use of the drive element to drive the flywheel rather than the spool.

By removing the requirement for the spool to transmit torque to the flywheel, the spool is no longer significantly stressed, hence the spool can be manufactured from low cost, lightweight materials and rolling element bearings in the spool assembly are no longer required. The spool can be of a diameter large enough for a recoil spring to be fitted within the spool assembly and there is no limit imposed on the length of pull-cord that can be stored on the spool. The decoupling of the spool from the flywheel drive system also allows for the spool assembly, including the pull-cord and coil spring, to be provided as a low cost unit that is easy for the user to replace without affecting the drive system. Additionally, it enables apparatus to be constructed in which the pull-cord is not stored on a spool but rather stored as a length, loaded by a spring or bungee.

According to a fifth aspect of the invention a user interface system for a hand-held exercise device comprises:
  sensor means capable of detecting rotation of the resistance element;
  timing and processor means capable of generating data relating to the rotation of the resistance element;
  radio transmission means that transmits said data to an external receiving device;
Preferably software is provided for the external receiving device that produces a display of information and guidance for the user during exercise.

These elements are shown schematically in FIGS. 49 and 50. The hand-held exercise apparatus transmits data that is received by external device 240 or 250. Examples of external devices include mobile phones 240, personal computers, games consoles, televisions, and media players.

Preferably the data is transmitted using a standard protocol such as Bluetooth. Values representing the speed and acceleration of the flywheel can be derived from the data. Preferably software resident on the external receiving device produces a display of exercise performance to the user. Preferably this display includes a representation of the tension in the pull-cord.

Preferably the values of speed and acceleration of the resistance element during the recoil stroke are used to derive values that define the relationship between the speed of the resistance element and the damping torque applied to the resistance element. Preferably facility is provided for data to be recorded while the user performs exercise. Preferably facility is provided for data collected during exercise to be used to derive and indicate the strength of the user, preferably measured in terms of maximum achievable pull-cord tension, in relation to particular exercises.

Preferably such recorded information, relating to the strength of the user for a given exercise, is used to guide the user when the user subsequently repeats the exercise. For example the user is instructed to perform the exercise at a loading that is a set proportion of the user's maximum achievable load. Preferably the user is provided with a target range of pull-cord tension and an indication of this range is displayed together with an indication of the current value of pull-cord tension. This allows the user to adjust the pull-cord tension accordingly throughout the pulling stroke. FIG. 50 shows this. The display of a external device 250 shows a force reading 252 and a graphical representation of the force 251. A graphical display 253 indicates the target range. Preferably guidance is provided for the user such that the user is prompted to perform a number of exercises in a predetermined sequence. These prompts are produced in response to the exercise data received by the external device.

For example, the user is prompted to start a new exercise once a set number of repetitions of the current exercise have been completed.

Preferably the software provided runs on a mobile device such as a mobile phone or media player. This enhances the portability of the exercise solution and personalises the exercise experience.

The sensor and transmission means mounted within the exercise apparatus can be powered by a battery. In this case it is preferable that the battery is a commonly available type and is easily accessible by the user for replacement. It is preferable to mount the battery within the handle of the apparatus with access provided by an end cap.

Alternatively the sensor and transmission means can be powered by an electrical generator driven by the flywheel.

Preferably one or more switch means is located close to the first handle of the device. Preferably the switch can be used to make selections and activate functions of the software running on the external device.

An electrical actuator, controlled by the processor of the hand-held exercise device, may be used to adjust the damping means to change the level of resistance. Preferably the user then adjusts the level of resistance by means of one or more switches near to the first handle of the apparatus. The output from the switches is received by the processor which then produces an output to the drive of the electrical actuator. Preferably a position sensor is fitted to the adjustment mechanism of the damping means. Output from the position sensor is received by the processor. Hence closed-loop control of the position of the adjustment mechanism is possible. Preferably the actuator is used to automatically drive the adjustment mechanism to predefined positions or resistance levels at the start of each new exercise. These resistance levels are set according to the ability and training needs of the user.

It is particularly advantageous that a wire-free interface be used in the case of hand-held exercise apparatus. In this case it is impractical to mount a display on the hand-held apparatus due to the apparatus being in a variable position and orientation during exercise. It is advantageous to use common electronic devices, such as mobile phones, to provide processing and display capabilities because the processing and display functions are provided without imposing an additional cost on the manufacture of the exercise apparatus. Indeed the components required for a radio transmission system are commonly available at a low cost relative to a system that includes the necessary processing and display means as part of the apparatus.

Other preferred features are set out in the detailed description.

BRIEF DESCRIPTION OF THE DRAWINGS

FIGS. 5-7 show a preferred embodiment of a hand-held exercise device that includes a preferred embodiment of a compact resistance mechanism for exercise apparatus.

FIG. 8 shows a sectional view of an assembly of a one-way clutch unit 43 fitted to a drive element 42 such that torque can be transferred to a support tube 44 that is support by roller bearings 45 that run on a shaft 46. A large gear 47 is fixed to the support tube 44.

FIG. 14 shows a partially exploded view of a preferred embodiment of a hand-held exercise device that includes a preferred embodiment of a compact resistance mechanism for exercise apparatus. Some removable elements of the apparatus are shown.

FIG. 15 shows the spool assembly of a preferred embodiment of a hand-held exercise device that includes a preferred embodiment of a compact resistance mechanism for exercise apparatus.

FIG. 16 shows the handle assembly of a preferred embodiment of a hand-held exercise device that includes a preferred embodiment of a compact resistance mechanism for exercise apparatus.

FIG. 17 shows elements of a preferred embodiment of a hand-held exercise device that includes a preferred embodiment of a compact resistance mechanism for exercise apparatus. In this case a motor 97 drives a lever plate 101 via a compact gearbox 98 and worm gear 99. The position of the magnets 65 can be sensed and controlled by an electronic control circuit 83.

FIGS. 25-29 show an alternative method of providing transmission means that couples movement of the pull-cord to rotation of the resistance element. In this case the transmission is provided by two stages of toothed gears.

FIG. 51 shows the drive element 43 pivotally mounted to a pivoting element 310 that is pivotally mounted to the frame at a pivot point 309.

FIG. 52 shows the drive element 43 pivotally mounted to the frame whereby grip element 59 is also pivotally mounted to the frame and the drive element and grip element each have elastically compliant surfaces 310 and 311 respectively.

FIG. 53 shows the drive element 43 pivotally mounted to the frame whereby guide element 40 is also pivotally mounted to the frame; a grip element 59 and a loading element 60 are pivotally mounted to a pivoting base 314; and the pull-cord 5 pushes against the loading element such that it causes the pivoting base to rotate about pivot 313 such that the grip element 59 is moved towards the drive element 43.

DETAILED DESCRIPTION OF THE DRAWINGS

Figure 1:
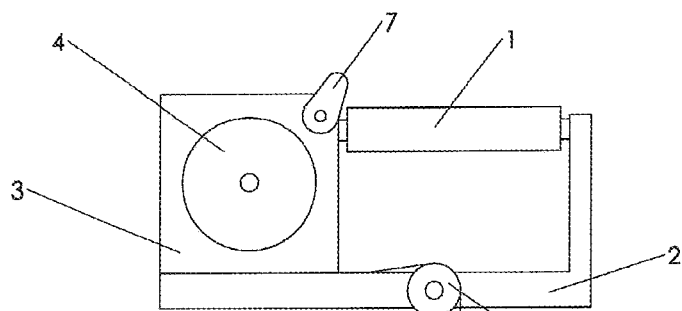
FIGS. 1-4 show preferred general arrangements of a hand-held exercise device.
Figure 2:
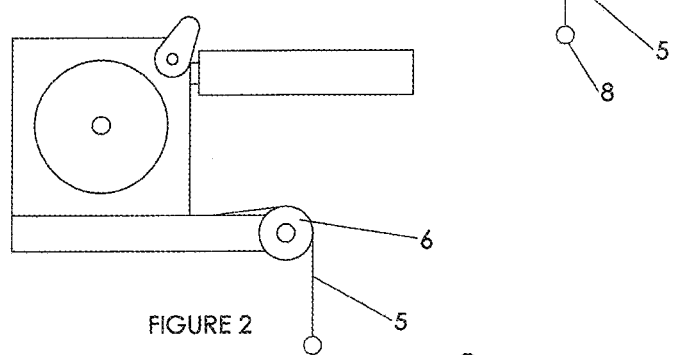
Figure 4:
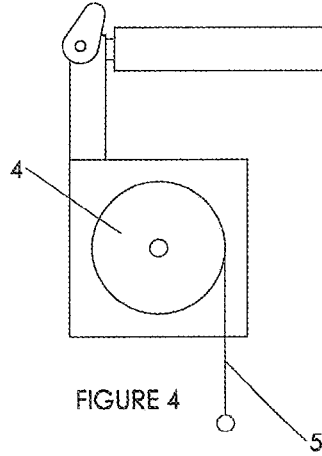
Figure 3:
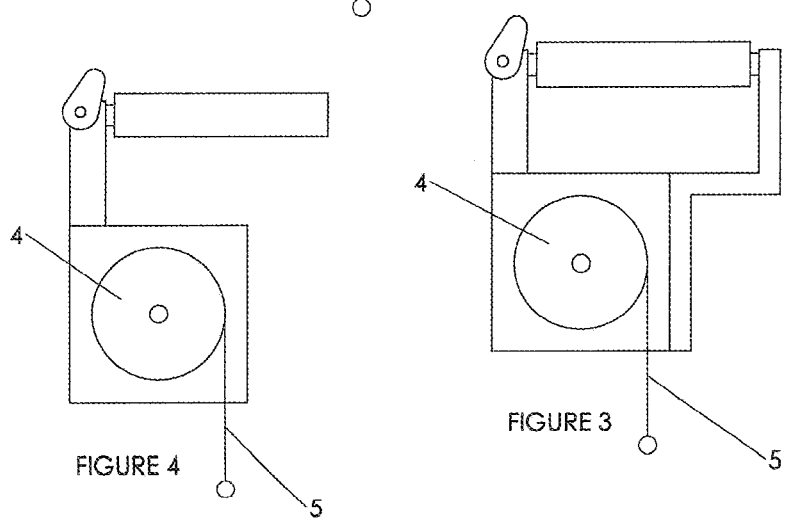

FIGS. 1-4 show preferred general arrangements of the hand-held exercise device. A first handle 1 is fixed to a frame 2. A resistance unit 3 is fixed to the frame. The resistance unit comprises a spool 4 that is coupled to a flywheel by transmission means. A pull-cord 5 is wound around the spool. The pull-cord is arranged such that when pulled from the frame, the line of action of tension in the pull-cord passes close to the handle. Preferably, at the end of the pull-cord is an attachment feature 8 that can be used to fix the pull-cord to a fixture or accessories. Preferably, an adjustment means 7 is located close to the handle, within reach of the user's thumb or fingers of the hand that grips the first handle. Exercise is performed whereby the user fixes the pull-cord to a fixture or second handle and moves the first handle so that the pull-cord is extended from the frame. FIGS. 2 and 4 show arrangements in which the handle is fixed at one end only. This is advantageous in that there is less restriction to movement of the hand of the user. FIGS. 1 and 3 show arrangements in which the handle is fixed at each end. This is advantageous in that the bending stress in the handle support structure is reduced. FIGS. 1 and 2 show arrangements whereby the pull-cord passes over a guide element 6 in order to ensure the pull-cord tension acts at a suitable position relative to the handle. FIGS. 3 and 4 show simpler arrangements whereby the pull-cord exits at a tangent to the spool.

The following descriptions of resistance means, adjustment means, drive means, gearing means and interface means, as well as descriptions of use of the exercise-device with accessories, are all applicable to each of the general arrangements described.

FIGS. 5-7 and FIGS. 12-14 show a preferred embodiment of a hand-held exercise device that includes a preferred embodiment of a compact resistance mechanism for exercise apparatus.

A frame 2 is fixed to a handle core 21. A handle sleeve 20 is of largely cylindrical form. The handle sleeve is fitted around the handle core so that it can rotate about the central axis of the handle sleeve. It is preferable that the outer surface of the handle sleeve is coated with a rubber compound or similar high grip material.

It is preferable that the handle axis passes close to the centre of mass of the apparatus. In practice this requires that the handle axis passes close to the axis of the flywheel.

The handle core 21 is supported at a first end by a shaft 26 that also passes through the frame members 22 and 23. A second end of the handle core is supported by a ring 31 that is fixed to a bar 32. The bar is fixed to a tube 33 that is fixed to the frame. Preferably the ring, tube and bar are steel and are fixed together by welding.

A spool element 78 provides a cylindrical surface around which is coiled a length of pull-cord 5. The pull-cord comprises a first end and a second end and a flexible member between the first and second end. A first end of the pull-cord is fixed to this cylindrical surface. It is preferable that the means of fixing allows for easy removal of the pull-cord from the spool. A preferable fixing means is hook-and-loop tape. The spool element is supported on an arbor 75 such that the spool element may rotate about this arbor. A coil spring 77 is fitted between said arbor and said spool element such that if the spool is moved such that the pull-cord unwinds from the spool the coil spring will provide a torque acting on the spool that acts to move the spool in the direction that rewinds the pull-cord on to the spool.

A guide element 40 is supported within the frame. The pull-cord passes around a portion of the surface of the guide element. The guide element is arranged such that the central axis of the guide element is perpendicular to the central axis of the handle and such that a tangent line from the surface of the guide element, that it is also perpendicular to the central axis of the handle, projects through the mid-point of the handle. This arrangement ensures that the line of action of tension in the extended section of pull-cord passes through the centre of the handle. This ensures that the handle is not twisted in the hand of the user by the tension in the pull-cord.

An attachment bar 19 is fitted to the second end of the pull-cord. During use of the apparatus the attachment bar is fixed to accessories such that tension develops in the pull-cord and the distance between the attachment bar and guide element extends. Said attachment bar is of a size such that it cannot be pulled through the gap that exists between a pin 41 and the guide element 40.

The pull-cord passes around a drive element 42. A high friction material is fixed to the outer cylindrical surface of the drive element. Preferably this material is a high strength reinforced rubber. Alternatively a harder material with a rough surface could be used. It is possible that the cylindrical surface of the drive element could have a knurled finish or a rough coating such that no additional wrapping material is necessary. Preferably, the pull-cord is a narrow webbing of woven fabric. Preferably the pull-cord comprises narrow polyester webbing. The pull-cord is pressed against the drive element by a grip element 59. Preferably the position of the drive element 43 relative to the grip element 59 and guide element 40 is such that the pull-cord makes contact with more than 270 degrees of the circumference of the drive element. It is important to maximise the contact area between the drive element and the pull-cord in order to reduce the shear stress at contact so that wear to the pull-cord and grip wheel material is minimised. The grip element 59 must push the pull-cord 5 against the drive element with sufficient force to ensure that there is friction between the pull-cord and drive element such that there is no significant slip between the pull-cord and drive element. By wrapping a length of pull-cord around the grip wheel, use is made of the capstan effect in reducing the tension in the pull-cord at the position where the grip element makes contact with the pull-cord. For instance, if a coefficient of friction of 0.5 exists between the pull-cord and drive element surface material and the contact angle is 270 degrees, the pull-cord tension that needs to be resisted by the friction at the grip element position will be less than one tenth of the tension that exists at the loaded end of the pull-cord. Hence the contact force at the grip element can be relatively low—in this case limited to approximately one fifth of the tension of the pull-cord at the loaded end. To gain a practical advantage from this system of drive element and grip element it is necessary to ensure that at the pull-cord makes contact with the drive element over an angle of at least 45 degrees measured from the axis of rotation of the drive element. For a coefficient of friction of 0.5, this results in the friction at the grip element position needing to be 68% of the tension at the loaded end of the pull-cord. Where possible, a larger contact angle is recommended.

Figure 9:
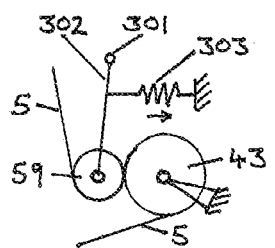
FIG. 9 shows a system that loads the grip element 59 against the pull-cord 5 and drive element 43 by use of a spring 303.

The grip element 59 is pivotally mounted in a pivoting assembly 57. A loading element 60 is also pivotally mounted within the pivoting assembly. The pivoting assembly can rotate about a pivot 58. The pull-cord 5 makes contact with the loading element 60 at a position between the drive element 43 and the guide element 40. The pull-cord contact pushes the pivoting assembly towards the drive element and forces the grip element to push the pull-cord against the drive element. The geometry of the assembly is such that the contact force between the grip element and the pull-cord is a fixed proportion of the tension of the pull-cord at the loaded end. This arrangement ensures that the load applied at the grip element is never greatly in excess of the load required to maintain grip. It is of course possible to replace this arrangement with a system that loads the grip element against the pull-cord and drive element by use of a spring. An example of such an arrangement is shown in FIG. 9. In this case, the force applied to the grip element 59 has to be sufficient to ensure grip at the maximum limit of the pull-cord tension at the loaded end. An extension spring 303 pulls on a lever 302 that is mounted to a pivot 301. The grip element is pivotally mounted to the lever.

Figure 10:
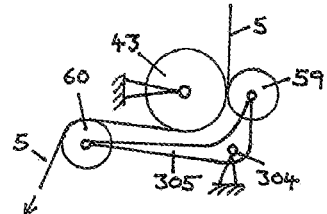
FIG. 10 shows an alternative drive system to that shown in FIGS. 5-7, in which the pull-cord 5 passes between a drive element 43 and a grip element 59 and the grip element is mounted in a pivoting assembly 305 together with a loading element 60.
Figure 11:
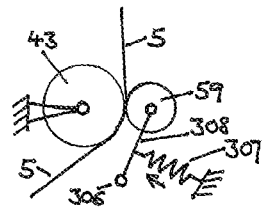
FIG. 11 shows an alternative system that loads the grip element 59 against the pull-cord 5 and drive element 43 by use of a spring 307.

An alternative to the drive system described above is shown in FIG. 10. The pull-cord passes between a drive element 43 and a grip element 59. In this case the pull-cord is not wrapped over a large portion of the outer surface of the drive element so the contact force and the shear stresses in the contacting materials are relatively large. The grip element is pivotally mounted in a pivoting assembly 305 together with a loading element 60. The assembly can rotate about a pivot 304. The pull-cord 5 makes contact with the loading element at a position between the drive element and the guide element. The pull-cord contact pushes the pivoting assembly towards the drive element and forces the grip element to push the pull-cord against the drive element. The geometry of the assembly is such that the contact force between the grip element and the pull-cord is a fixed proportion of the tension of the pull-cord at the loaded end. It is of course possible to replace this arrangement with a system that loads the grip element against the pull-cord and drive element by use of a spring. An example of such an arrangement is shown in FIG. 11. In this case, the force applied to the grip element would have to be sufficient to ensure grip at the maximum limit of the pull-cord tension at the loaded end. A compression spring 307 pulls on a lever 308 that is mounted to a pivot 306. The grip element 59 is pivotally mounted to the lever.

It is possible that more than one drive element is used. In this case the drive elements are rotationally coupled so that all the drive elements can transfer torque to the resistance element. The drive elements can be coupled by a system of gears or belts and pulleys. The pull-cord passes over the outer surface of each drive element. This has the advantage of providing a greater surface area for the pull-cord to grip.

A one way clutch unit 43 is fitted to the drive element 42 such that torque can be transferred to a support tube 44 in one rotational direction only. This allows the drive element to rotate during recoil of the pull-cord while the resistance element continues to spin. Said support tube is supported within the frame by roller bearings 45 that run on a shaft 46. A large gear 47 is fixed to the support tube. FIG. 8 shows a sectional view of this assembly. A small gear 48 is fixed to a driveshaft 49. Said small gear mates with said large gear 47. Preferably said large gear and said small gear have teeth of helical form in order to reduce the level of noise produced by the apparatus. Said driveshaft is supported within the frame 24 by two ball bearings. A resistance element is fixed to the end of the driveshaft.

Preferably said resistance element comprises a continuous ring 51 of an electrically conductive material. See FIG. 12. Preferably this material is copper or aluminium. Rotation of said resistance element is damped by an eddy current brake effect due to the magnetic field associated with permanent magnets 65. Adjustment of the magnitude of resistance caused by the eddy current brake for a given speed of rotation can be made by changing the position of the permanent magnets relative to the resistance element.

A feature of the present invention is the provision of an adjustment means operated by the thumb or finger of the user. A steel plate 66 is mounted within the frame and guided by bosses 68 moulded within the case such that it can slide radially relative to the resistance element. A lever 70 is mounted on shaft 26. A pin 69 fixed to the lever engages with a slot of the steel plate. An adjustment lever 72 is fitted to the shaft 26. Hence rotation of the adjustment lever causes the steel plate to move radially relative to the resistance element. Two permanent magnets 65 are mounted on the steel plate. A first magnet has a South pole facing the steel plate and a second magnet has a North pole facing the steel plate. The magnets face the electrically conductive ring of the resistance element. The gap between the magnets and the ring is the minimum necessary to allow clearance for free rotation of the resistance element. In practice this gap is approximately 1 mm. On the opposite side of the resistance element, facing the magnets, is a second steel plate held in place by the case. The second steel plate is held as close as possible to the resistance element so not to touch the resistance element during rotation of the resistance element. The two magnets, the two steel plates, and the air gaps between them form a magnetic circuit such that the magnetic flux is concentrated in the air gaps. When the adjustment is set to maximum resistance, the magnet faces are fully facing the electrically conductive ring. Hence almost all of the flux in the air gaps passes through the ring. As the adjustment is moved to provide lower resistance, the magnets move such that less of the area of the faces of the magnets overlaps with the ring. Hence less of the flux in the air gaps passes through the ring and the eddy current braking effect is less.

It is obvious that a number of alternative mechanical or electro-mechanical arrangements could be provided that would result in a similar adjustment of flux passing through the resistance element with movement of an adjustment element close to the hand of the user. An important aspect of the adjustment is that it enables the user to make an adjustment using the hand that grips the handle without releasing the grip of the handle. One such arrangement is shown in FIG. 17. In this case an electric motor 97 is fixed to a bracket 100 that is fixed to the frame. The motor drives a lever plate 101 via a compact gearbox 98 and worm gear 99. The lever plate moves about pivot 102. A pin 103 fixed to the steel plate 104 passes through a slot in the lever plate. Movement of the lever plate results in movement of the steel plate radially relative to the resistance element. The slider of a resistive position sensor 85 is connected to the steel plate. Hence the position of the magnets can be sensed and controlled by an electronic control circuit 83. A switch 105 located close to the hand of the user allows the user to adjust the resistance to a higher or lower level. An additional advantage of this system is that it allows for automatic adjustment of resistance controlled by a computer program. One benefit of this would be the resistance level being automatically set to the correct level for an exercise selected by the user. Additionally this system provides the hardware capability for the resistance level to be automatically adjusted during exercise, for example to maintain a constant pull-cord speed or to maintain a constant pull-cord tension.

A sensor 84 is positioned on a circuit board 83 such that the output from the sensor switches when spokes 55 of the resistance element pass over the sensor. Preferably the sensor is an optical sensor. Alternatively a magnetic sensor could be used. The output from the sensor is processed by a microcontroller. The microcontroller controls a radio transmission module. Data is transmitted from the transmission module to a receiving device. The receiving device processes the data to determine values for speed and acceleration of the resistance element. The moment of inertia of the resistance element is known. Therefore the torque acting on the resistance element can be approximated by:

$$\text{Torque} = I \cdot \text{acceleration} + A \cdot \text{speed}/(1 + \text{speed} \cdot B)$$

Where A and B are constant for a given position of the braking magnets. A and B can be found during periods when no pulling force is applied to the pull-cord because in this case the following equation holds true:

$$0 = I \cdot \text{acceleration} + A \cdot \text{speed}/(1 + \text{speed} \cdot B)$$

Readings from the position sensor can also be used to select pre-determined values that define the relationship between the braking torque acting on the resistance element and the rotation speed of the resistance element.

Figure 12:
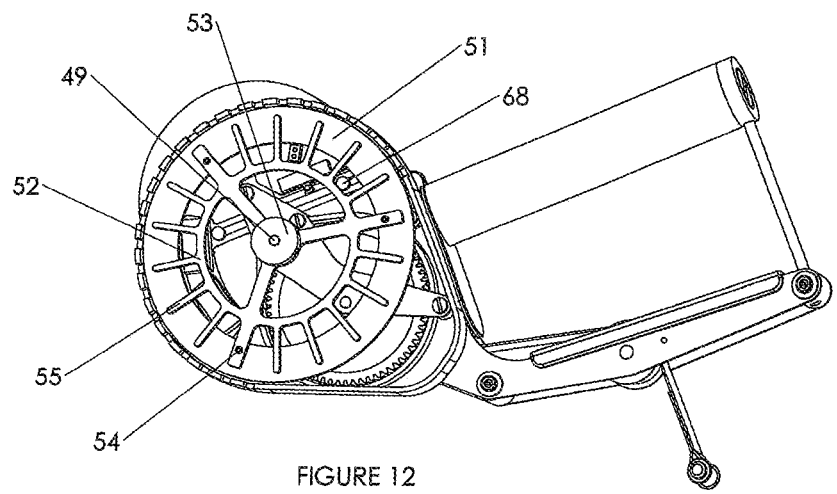
FIG. 12 show elements of a preferred embodiment of a hand-held exercise device that includes a preferred embodiment of a compact resistance mechanism for exercise apparatus. In this case a preferred resistance assembly is shown, in which the resistance element comprises a ring 51 of an electrically conductive material.
Figure 13:
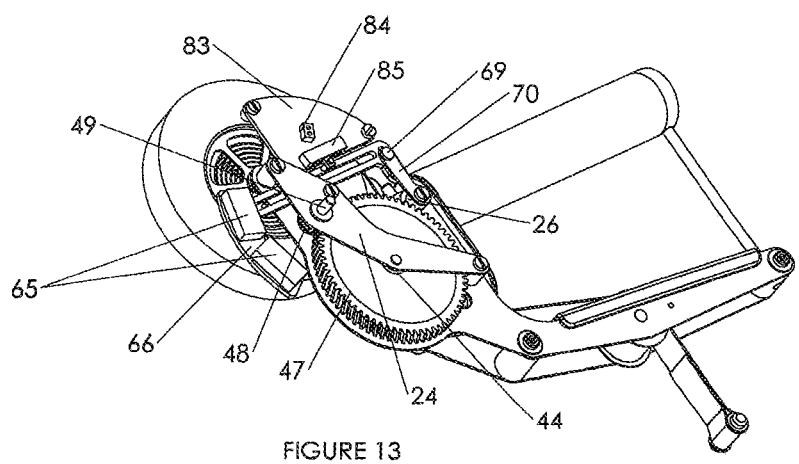
FIG. 13 shows elements of a preferred embodiment of a hand-held exercise device that includes a preferred embodiment of a compact resistance mechanism for exercise apparatus. In this case an adjustment means operated by the thumb or finger of the user is shown.

FIG. 12 shows a preferred resistance element assembly. The resistance element comprises a ring 51 of an electrically conductive material. For a given magnetic flux and a given thickness of the ring, the eddy current braking torque is approximately proportional to the electrical conductivity of the ring. Preferably the ring is copper to take advantage of the high electrical conductivity of copper. An aluminium ring could be used as an alternative in which case the ring should be of greater thickness to achieve a similar level of damping.

The ring is fixed to a support plate 52. The support plate includes radially extending features 55. These features force air to flow over the ring as the flywheel rotates. This is important for cooling the flywheel ring as it is heated by the eddy currents. Preferably the support plate is stainless steel and is fixed to the ring by mechanical fasteners such as rivets 54. The resistance element is mounted to the driveshaft 49 by a hub 53.

FIG. 6 shows the device with a case fitted.

A case 36 and cover 37 enclose the resistance element, gears, and resistance mechanism. Apertures in the case allow air to exit. This is important for allowing airflow over the resistance element in order that the resistance element remains cool. FIG. 5 shows plastic guards 29 and 30 that shield the hand of the user from the edges of the frame.

FIG. 16 shows the handle assembly with inner core 21 and outer sleeve 20 hidden. A switch lever 88 is pivotally mounted on shaft 26. The switch actuator makes contact with a microswitch 89 that is mounted on a plastic mount 90. A battery 91 is contained within the handle core. A threaded endcap 92 is removable so that the battery can be changed. Preferably the endcap material is stainless steel. Alternatively the end cap could be plated aluminium. The endcap makes contact with the cathode of the battery. The endcap is also in contact with the handle core. Preferably the handle core is an aluminium alloy tube. Hence there is an electrical connection between the cathode of the battery and the handle core and frame. A connection to the anode of the battery is made via a conductor carried within the plastic mount. The switch acts to pull-down an input of the electronic circuit to the electrical ground of the circuit. Connections from the anode and cathode of the battery are also carried to the circuit board 83. The connection from the cathode is carried by the handle core and frame. The mounting posts of the circuit board provide an electrical connection between the frame and the circuit board. This arrangement reduces the number of wires that are required to connect the switch and battery to the circuit board. Obviously a number of switches could be fitted in order to allow more options for user input. Preferably an additional function of the switch is to turn on the electronic circuit. Preferably the electronic circuit automatically shuts down after a period of inactivity.

The user is provided with easy access to a number of elements of the apparatus for maintenance and repair purposes. FIG. 14 shows some removable elements of the apparatus. FIG. 15 shows the spool assembly.

The spool assembly comprises the spool 78, arbor 75, coil spring 77 and cover 79. The coil spring is secured at the outer end to an internal surface of the spool. The coil spring is secured at the inner end to the arbor. A circlip 80 holds the cover in place. The spool and cover can rotate about the arbor. Relative rotation between the spool and arbor is resisted by the spring.

The spool assembly is mounted to the frame by a screw 76. Removal of the screw allows easy removal and refitting of the spool assembly and pull-cord. This allows the user to replace the pull-cord and/or the spool-assembly in the event of a damaged pull-cord or broken spring. The arbor 75 has flats 81 that allow the arbor to be turned by a suitable spanner or custom tool. Once the spool assembly and pull-cord have been refitted, the screw is loosened to allow rotation of the arbor. The arbor is turned by the flats to pre-load the coil spring. Once sufficient pre-loading has been achieved, the screw is tightened to fix the arbor in place.

The shaft 46 is supported by a support plate 61. The support plate is located over pins 63 and fixed to the frame member 22 by a screw 62. Hence the support plate can be easily removed by the user. Removal of the support plate allows the drive element 42 to be removed and replaced. This is useful in the event of excessive wear of the outer surface of the drive element. Removal of the support plate also provides easy access for replacement of the pull-cord.

Figure 18:
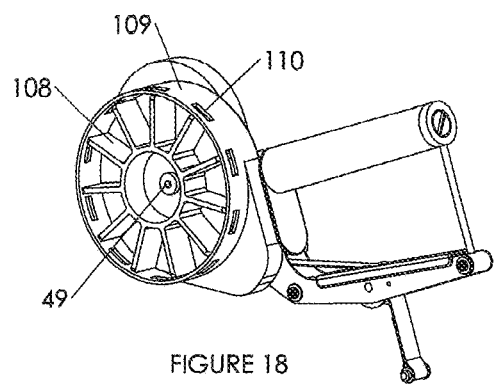
FIGS. 18 and 19 show an alternative damping mechanism for a hand-held pull-cord device in which the resistance element comprises a fan element 108. The second case part 111 shown in FIG. 19 is hidden in FIG. 18 in order to reveal internal components.
Figure 19:
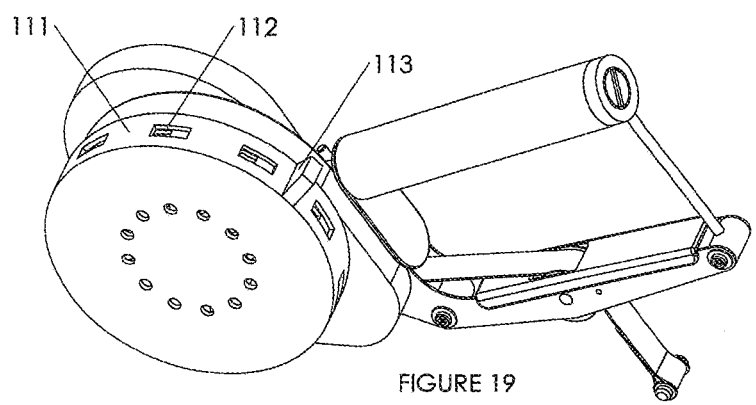

FIGS. 18 and 19 show an alternative damping mechanism for the hand-held pull-cord device. The resistance element comprises a fan element 108. Rotation of the fan element 108 is resisted by air pressure acting on the blades.

A first case part 109 is fixed to the frame and surrounds the fan element. A second case part 111 is mounted to the first case part so that is can rotate about the first case part. Rotation of the second case part changes the overlap between apertures 110 in the first case part and apertures 112 in the second case part. A lever 113 allows the user to rotate the second case part while holding the handle. Changing the overlap between the apertures adjusts the flow of air exiting the case, hence the level of resistance to rotation of the fan element is changed. Alternatively adjustable apertures can be arranged to limit the flow of air in to the fan enclosure.

The outer case could alternatively be moved by a system of electric motor, gearing, and control system as described previously for the case of magnetic damping.

The relationship between the braking torque acting on the fan element and the rotational speed of the fan element is different from the relationship discussed for the magnetically damped resistance element. However, it is still predictable to a useful level of accuracy. In this case the equation takes the form:

$$\text{Torque}=I\cdot\text{acceleration}+k\cdot\text{speed}^m$$

where I is the moment of inertia of the fan element. k and m are constants for a given setting of the case apertures and are determinable from data collected during periods in the return stroke when the user is not applying significant tension to the pull-cord. Other features of the apparatus discussed in previous embodiments are similarly applicable to this embodiment.

Figure 20:
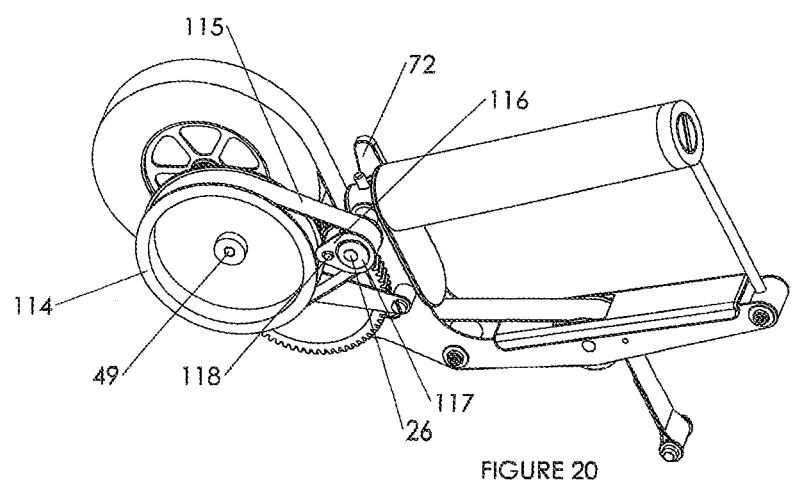
FIG. 20 shows another alternative damping mechanism for a hand-held pull-cord device in which a friction belt 115 acts on a resistance element 114 that is fixed to the driveshaft 49.
Figure 21:
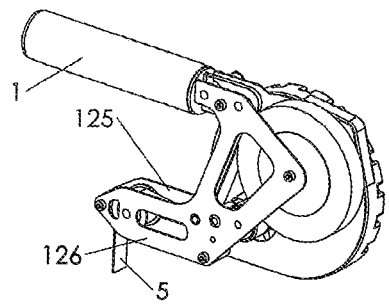
FIGS. 21-24 show elements of an alternative embodiment of a hand-held exercise device. In this case the handle 1 is supported at one end only.
Figure 22:
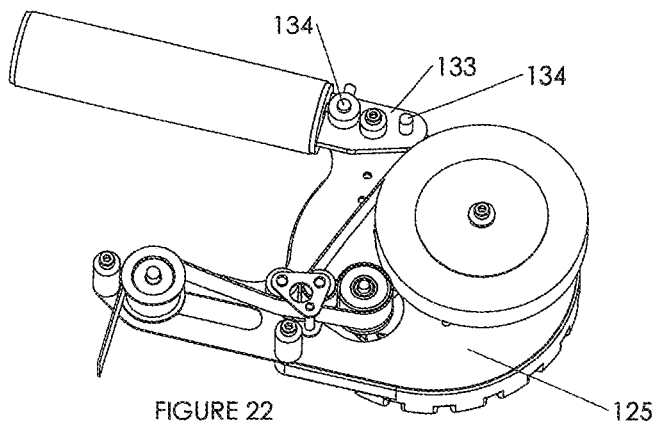
Figure 23:
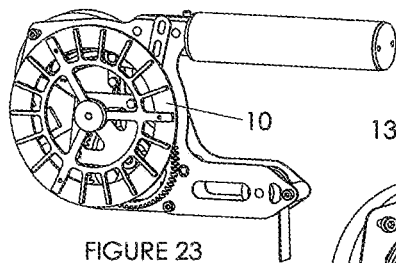
Figure 24:
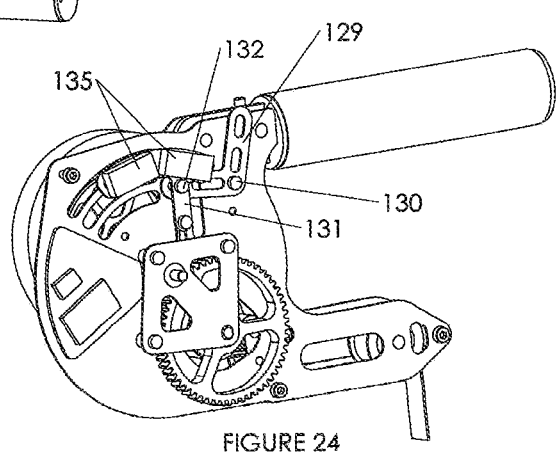

FIG. 20 shows another alternative damping mechanism for the hand-held pull-cord device. A friction belt 115 acts on resistance element 114 that is fixed to the driveshaft 49. The friction belt passes over a tensioning element 116. The outer surface of the tensioning element is roughened so that it grips the friction belt. Rotation of the tensioning element is prevented by a pin 118 fixed to the frame that passes through a slot in the tensioning element. An eccentric cam 117 acts on an internal cylindrical surface of the tensioning element. Rotation of the cam results in a change in separation between the tensioning element and resistance element. Hence the tension in the friction belt is changed and therefore the frictional torque applied to the resistance element is changed. The cam is fitted to shaft 26. The user can move lever 72 to cause rotation of the cam and hence adjust the resistance level. The elasticity of the friction belt is chosen to provide a suitable relationship between the position of the lever and the braking torque applied to the resistance element. The lever could also be moved by a system of electric motor, gearing, and control system as described previously for the case of magnetic damping. Other features of the apparatus discussed in previous embodiments are similarly applicable to this embodiment.

FIGS. 21-24 show an alternative embodiment of a hand-held exercise device. In this case the handle 1 is supported only at one end. The handle core is supported by a steel plate 133. The steel plate is fixed to the frame by pins 134 and screws. This arrangement provides a strong root for the cantilevered handle core. A guide roller 127 is pivotally mounted between frame members 125 and 126. Adjustment of position of the magnets 135 is made by a lever 129. The lever pivots about pin 130. The magnets are mounted on a steel plate 131 that is constrained by pins running in slots in the frame member 125 so that it moves radially relative to the resistance element 10. Pin 132 passes through a slot in the lever. Hence movement of the lever causes the magnets to move radially relative to the resistance element. Other features of the apparatus discussed in the previous embodiments are similarly applicable to this embodiment.

FIGS. 25-29 show an alternative method of providing transmission means that couples movement of the pull-cord to rotation of the resistance element. In this case the transmission is provided by two stages of toothed gears. A spool 154 is fixed to a tubular shaft 155 that is supported by bearings set within frame members 141 and 142. A one-way bearing 144 is fitted to the tubular shaft. A large gear 145 is fitted to the outer surface of the one-way bearing. The large gear meshes with a small gear 146. The small gear 146 is fixed to a large gear 148. Small gear 146 and large gear 148 are fitted to a shaft 150 that is mounted within bearings fitted within frame members 141 and 142. Large gear 148 meshes with a small gear 149 that is fitted to a driveshaft 151. The driveshaft is mounted within bearings that are mounted within frame members 141 and 142. A resistance element 10 is mounted to the driveshaft.

Magnets 162 are mounted on a steel plate 163 adjacent to the resistance element such that the resistance element is slowed by eddy current braking. The position of the magnets can be adjusted by lever 164. Other damping methods such as air damping and frictional damping as shown in FIGS. 18-20 are also applicable to this arrangement. A pull-cord 5 is fixed to the spool 154 and wound around the spool. The pull-cord passes over a guide roller 152, that is pivotally mounted between frame members 140 and 141, and exits the frame such that the line of action of tension in the external section of the pull-cord passes close to the middle of the handle.

Extension of the pull-cord from the frame causes rotation of the spool. The spool is coupled to the flywheel by the gear assembly hence resistance to extension of the pull-cord is provided.

A coil spring 156 is fitted within and fixed at a first end to a spring housing 160. The coil spring is fixed at a second end to an arbor 161. The spring housing is fitted to rotate about the arbor. The arbor is fixed to a support plate 157. The support plate is located by pins 159 and mounted to a frame member 140 by a screw 158. Hence the assembly of support plate, spring housing, arbor, and coil spring can be easily removed and replaced by the user of the apparatus. The outer surface of the spring housing fits within an inside surface of the spool. An engagement of features of the outer surface of the spring housing and features of the inner surface of the spool ensures that there is no relative rotation between the spring housing and the spool. FIG. 28 shows a tooth feature 165 of the spring housing that engages with slot features 166 of the spool.

For practical apparatus that provides useful resistance in a compact and lightweight form, a gear ratio from spool to flywheel of 10:1 or greater is required. This ratio results in a resistance element speed that is high enough to allow in excess of 200N tension in the pull-cord at a linear pull-cord speed of less than 1 meter per second. To achieve this ratio, two stages of gearing are required for the arrangement to be compact and practical. The coupling between spool and resistance element must be one directional. This can be achieved by including a one-directional clutch means at any stage in the gear system. Preferably a one-directional bearing of a spragg or roller type is used. Preferably the one-directional clutch means is fitted such that all the gears can continue to rotate while the spool moves in the direction that causes the pull-cord to be rewound on to the spool. This is advantageous in that the recoil means does not have to drive any gears.

Preferably all gears have helical tooth form in order that the noise generated by the gearing is minimised. It is possible that either or both gear stages could be substituted with a pulley stage consisting of a large pulley wheel and a small pulley wheel connected by a drive belt.

Other features of the apparatus discussed in previous embodiments are similarly applicable to this embodiment.

Figure 30:
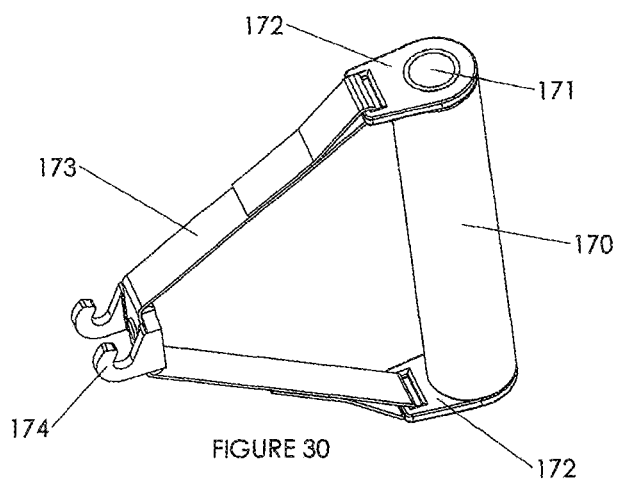
FIGS. 30 and 31 show a second handle for use with a hand-held pull-cord driven exercise apparatus.
Figure 31:
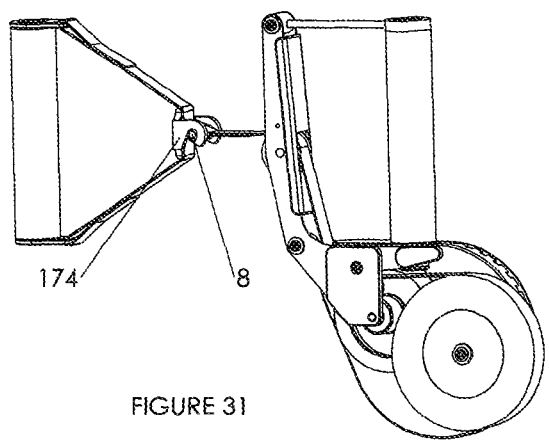

FIGS. 30-31 show a second handle for use with a hand-held pull-cord driven exercise apparatus. An outer sleeve 170 can rotate about an inner core 171. Brackets 172 are fixed at each end of the inner core. A strap 173 of fabric webbing is fixed to each bracket. An attachment hook 174 is fixed to the strap.

Figure 32:
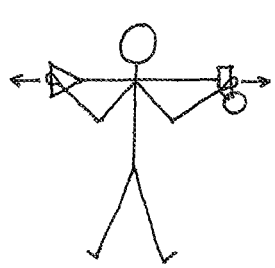
FIGS. 32-34 show examples of exercises that can be performed using this arrangement of apparatus.
Figure 33:
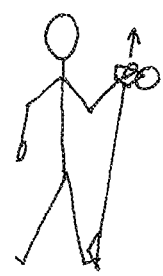
Figure 34:
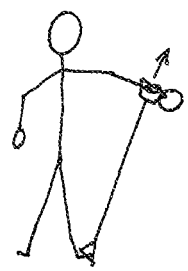

The attachment hook 174 fixes to an attachment feature 8 fitted to the pull-cord. FIGS. 32-34 show examples of exercises that can be performed using this arrangement of the apparatus. FIG. 32 shows a chest-expander exercise whereby the user grips the handle of the pull-cord unit in one hand and the second handle in the other hand and extends his or her arms out to the side. FIGS. 33 and 34 show a single handed arm-curl exercise and a single handed lateral raise exercise whereby the user holds the second handle to the floor with a foot and pulls the pull-cord unit upwards.

Figure 35:
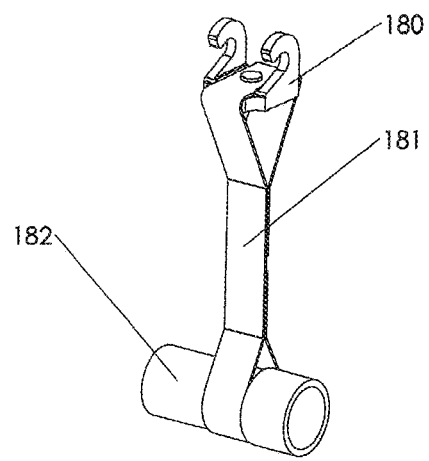
FIG. 35 shows a fixing device for providing a fixture point for the apparatus.
Figure 36:
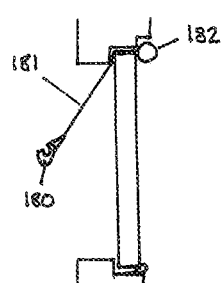
FIG. 36 shows how the fixing device can be trapped between a door and a door-frame.
Figures 37, 38:
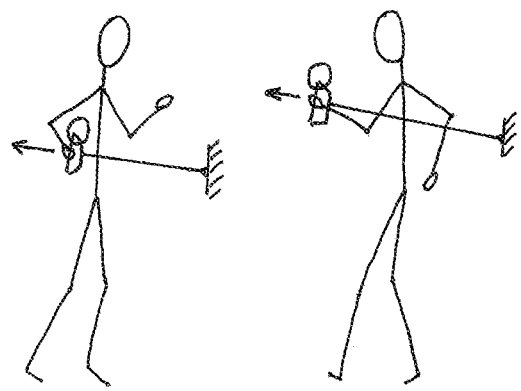
FIGS. 37 and 38 show pushing and pulling exercises that can be performed by fixing the pull-cord to the fixing device.

FIG. 35 show a fixing device for providing a fixture point for the apparatus. The device can be trapped between a door and a door-frame as shown in FIG. 36. A strap 181 connects an attachment hook 180 to a bar 182. The door is closed on the strap and the bar prevents the device from being pulled through the gap between the door and door-frame. FIGS. 37 and 38 and show pushing and pulling exercises that can be performed by fixing the pull-cord to the fixing device.

Figures 39, 40:
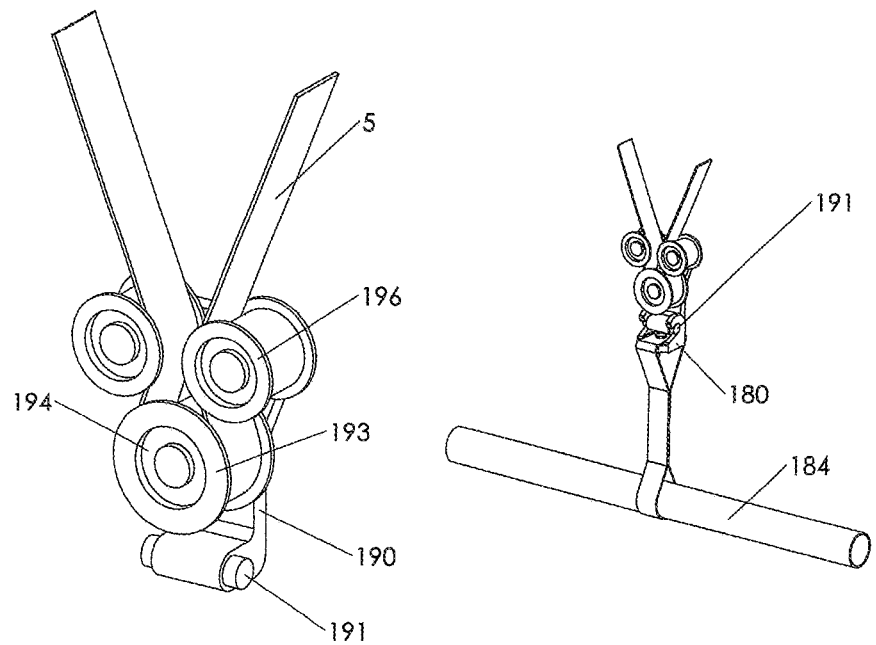
FIG. 39 shows a pulley unit that enables a variety of two-handed exercises.
FIG. 40 shows the fixing device with a long bar 184 fitted in place of the short bar 182.

FIG. 39 shows a pulley unit that enables a variety of two-handed exercises. The pull-cord 5 is passed around a pulley wheel 193. The pulley wheel is mounted on a bearing 194 that is mounted to a frame 190. The frame has an attachment feature 191 that allows the pulley unit to be connected to a fixture. Two guide-wheels 196 are pivotally mounted to the frame. The pull-cord makes contact with the outer surface of each guide-wheel. The guide-wheels have flanged sides to prevent the pull-cord from moving out of alignment with the pulley wheel.

FIG. 40 shows the fixing device with a long bar 184 fitted in place of the short bar 182. The user stands on the long bar hence a fixture for connecting the pull-cord close to the feet of the user is provided. The pulley unit can be pivotally connected to the attachment hook 180 of the fixing device.

The flexibility of the strap 181 of the fixing device allows the pulley unit to twist to allow the pull-cord to remain aligned with the pulley wheel 193. The pivoting nature of the connection between the attachment hook 180 and the attachment feature 191 of the pulley unit allows the pulley unit to pivot to allow the pull-cord to remain aligned with the pulley wheel.

Figures 41, 42, 43:
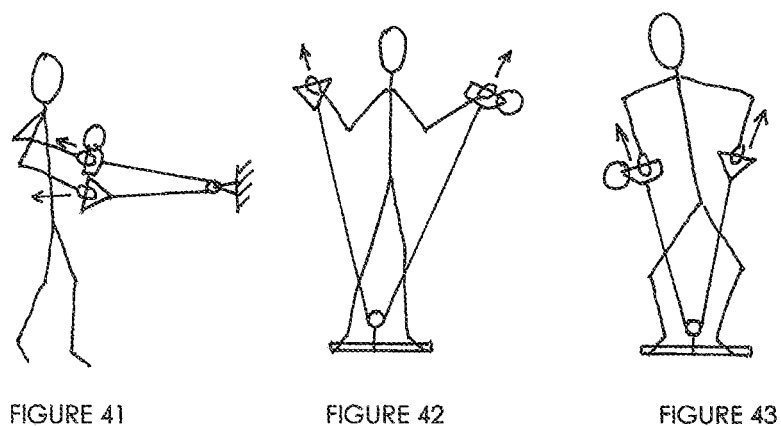
FIG. 41 shows an example of a two-handed pulling exercise whereby the pulley unit is fixed to a door or wall.
FIGS. 42 and 43 show examples of two-handed lifting exercises whereby the pulley unit is connected to a fixture held in place by the feet of the user.

FIG. 40 shows an example of a two-handed pulling exercise whereby the pulley unit is fixed to a door or wall. FIGS. 41 and 42 show examples of two-handed lifting exercises whereby the pulley unit is connected to a fixture held in place by the feet of the user. FIG. 41 shows a two-handed arm-curl and FIG. 42 shows an upright rowing exercise.

Figure 44:
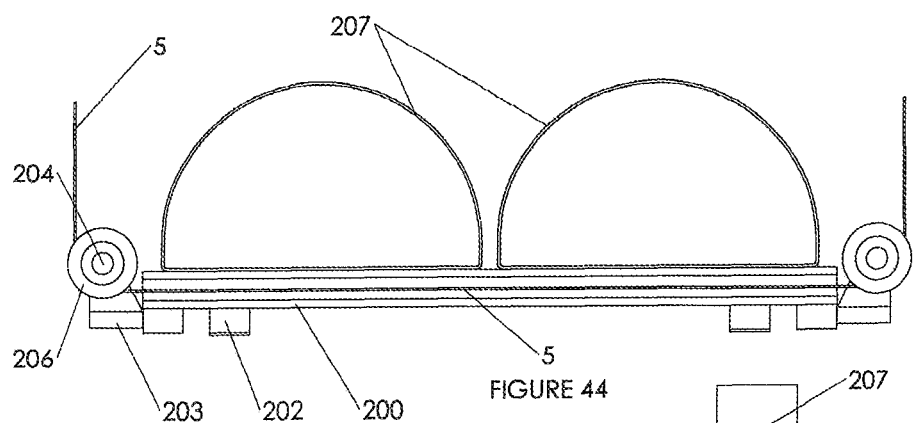
FIGS. 44-46 show an alternative pulley unit whereby two pulley wheels 206 are mounted at each end of a frame 200.
Figure 45:
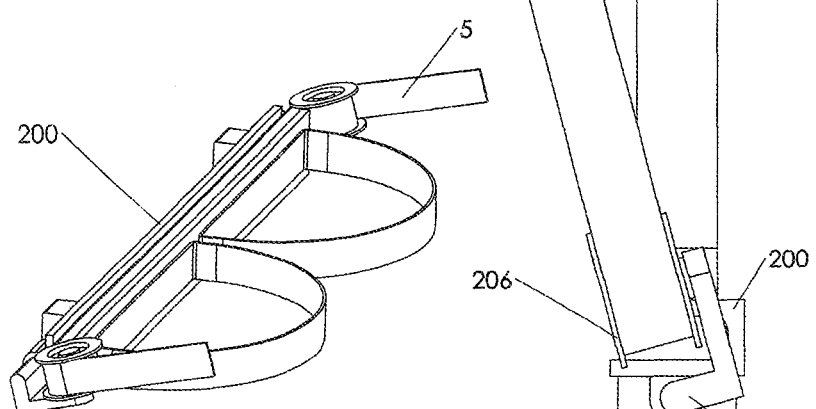
Figure 46:
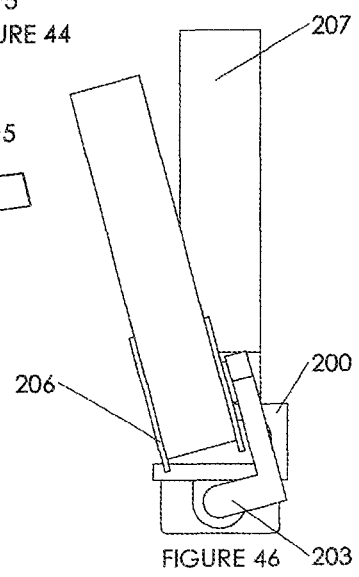

FIGS. 44-46 show an alternative pulley unit. Two pulley wheels 206 are mounted at each end of a frame 200. The separation between the two pulley wheels is sufficient for the user to be able to place both feet on the frame. Foot straps 207 can be used to attach the frame to the feet of the user. The pull-cord passes around each pulley wheel. The frame has a channel-shaped section that accommodates the pull-cord passing between the two pulley wheels. Each pulley wheel is mounted on a pivoted bracket 203. The pivot point of the bracket is in line with a projection of the centre line of the section of pull-cord that extends away from the pulley unit. The pulley wheel is mounted on a bearing that is fitted to a shaft 204 mounted on the bracket. The pivoting mounting for the pulley wheel allow the pulley wheel to remain aligned to the pull-cord if the pull-cord is pulled in a direction that is not perpendicular to the rotation axis of the pulley-wheel.

Figure 47:
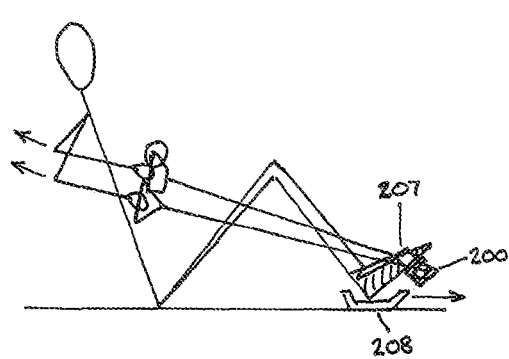
FIG. 47 shows the apparatus used to perform a seated rowing exercise.

FIG. 47 shows the apparatus used to perform a seated rowing exercise. The user holds the handle 1 of the pull-cord unit in one hand and the second handle in the other hand. The pull-cord is passed around each pulley-wheel 206 of the pulley unit. The user pushes on the pulley unit with his or her feet while pulling the two handles. The user may sit on the floor or on a stationary seat. A heel rest 208 is shown. This supports the user's feet as they move on the floor. Preferably the heel rest slides on the floor. Alternatively the heel rest rolls on a number of wheels.

Figure 48:
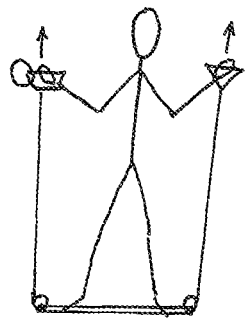
FIG. 48 shows the apparatus used to perform a two-handed lifting exercise.
Figure 49:
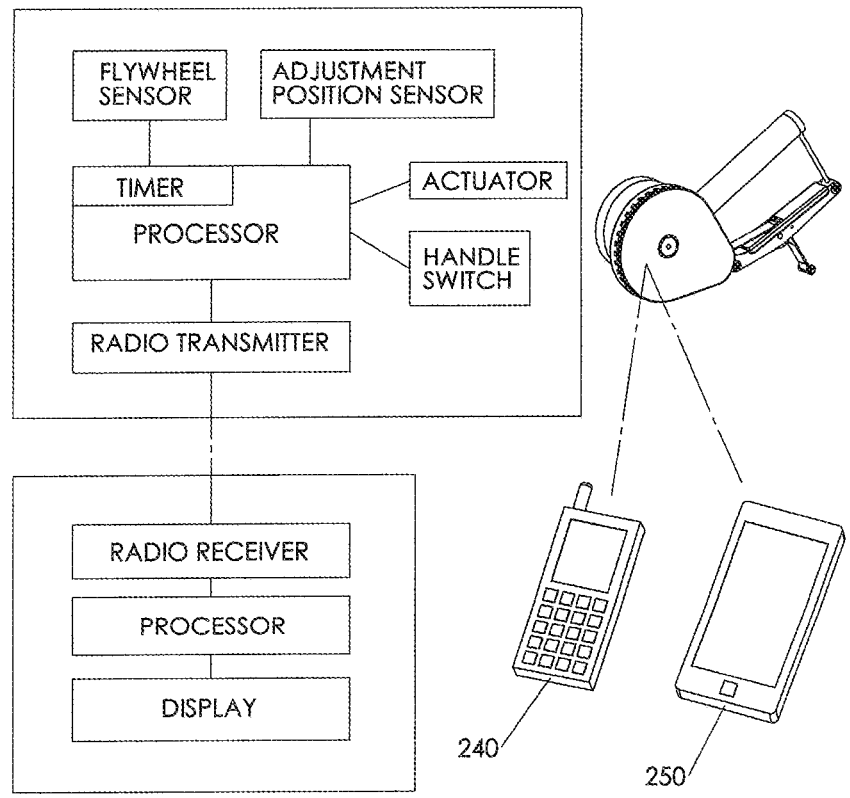
FIGS. 49 and 50 schematically show sensor means capable of detecting rotation of the resistance element; timing and processor means capable of generating data relating to the rotation of the resistance element; and radio transmission means that transmits said data to an external receiving device 250; whereby preferably software is provided for the external receiving device that produces a display of information and guidance for the user during exercise.
Figure 50:
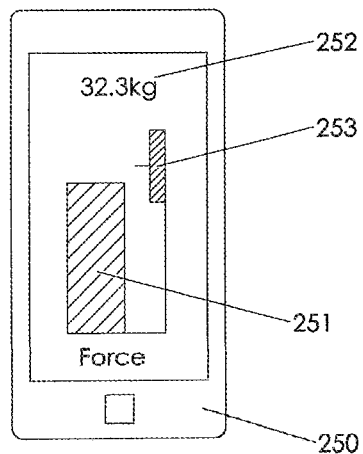
Figure 51:
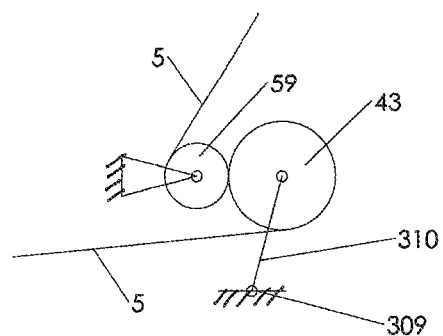
FIGS. 51-53 show further alternative methods for coupling the drive element and pull-cord by frictional contact.
Figure 52:
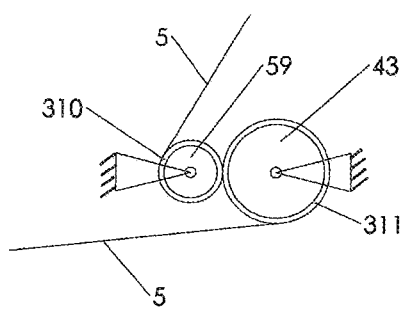
Figure 53:
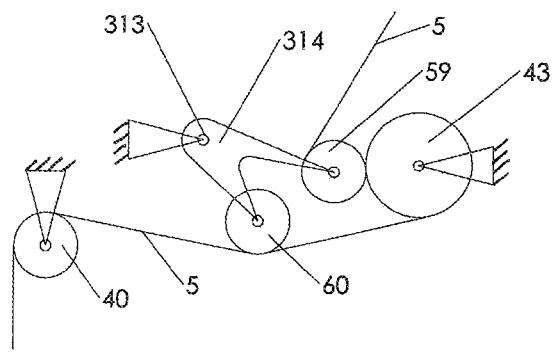

FIG. 48 shows the apparatus used to perform a two-handed lifting exercise. The pulley unit is placed on the floor and the user holds the pulley unit in place with his or her feet. Two stands 202 hold the frame at a distance above the floor to allow clearance for the brackets to pivot.

The invention is not limited to the precise details of the embodiments described.

The invention claimed is:

1. A resistance mechanism for a pull-cord driven exercise device comprising:
    a frame;
    a pull-cord;
    a drive element pivotally mounted to the frame;
    a resistance element pivotally mounted to the frame; and
    a transmission means that couples the drive element to the resistance element;
    the pull-cord being frictionally coupled to the drive element so that the resistance element is caused to rotate as the pull-cord is pulled from the device and further comprising a grip element biased into contact with the pull-cord so that the pull-cord is pushed against an outer surface of the drive element, wherein the grip element is pivotally mounted to a moveable support, the moveable support comprising a loading element pivotally mounted thereto, wherein the grip element is urged towards the drive element in response to tension in the pull-cord such that a portion of the pull-cord is positioned in contact with the grip element and drive element.

2. A resistance mechanism for a pull-cord driven exercise device comprising:
    a frame;
    a pull-cord;

a drive element pivotally mounted to the frame;
a resistance element pivotally mounted to the frame; and
a transmission means that couples the drive element to the resistance element;
the pull-cord being frictionally coupled to the drive element so that the resistance element is caused to rotate as the pull-cord is pulled from the device and further comprising a grip element biased into contact with the pull-cord so that the pull-cord is pushed against an outer surface of the drive element and the grip element, wherein the resistance is adjustable by a motor and gearing means that is mechanically coupled to one or more magnet elements such that operation of the motor causes the magnet elements to move relative to the resistance element.

* * * * *